United States Patent [19]

Devaney et al.

[11] Patent Number: 5,586,200
[45] Date of Patent: Dec. 17, 1996

[54] SEGMENTATION BASED IMAGE COMPRESSION SYSTEM

[75] Inventors: Patrick Devaney, Freehold, N.J.; Daniel Gnanaprakasam, Secane, Pa.; Peter Westerink, Mount Laurel, N.J.; Robert Topper, Hatboro, Pa.

[73] Assignee: Panasonic Technologies, Inc., Princeton, N.J.

[21] Appl. No.: 178,948

[22] Filed: Jan. 7, 1994

[51] Int. Cl.$^6$ ........................................... G06K 9/36
[52] U.S. Cl. ........................................... 382/232
[58] Field of Search ........................... 382/232, 233, 382/234, 235, 239, 240, 244; 348/437, 438, 423, 397, 400

[56] References Cited

U.S. PATENT DOCUMENTS

| | | | |
|---|---|---|---|
| 4,718,104 | 1/1988 | Anderson | 382/240 |
| 4,780,760 | 10/1988 | Waldman et al. | 348/397 |
| 4,903,317 | 2/1990 | Nishihara et al. | 382/244 |
| 5,025,482 | 6/1991 | Murakami et al. | 382/239 |
| 5,239,597 | 8/1993 | Chung et al. | 382/233 |
| 5,287,420 | 2/1994 | Barrett | 382/235 |
| 5,367,334 | 11/1994 | Nishino et al. | 348/438 |
| 5,412,429 | 5/1995 | Glover | 348/397 |

OTHER PUBLICATIONS

Gonzales et al, Digital Image Processing, 1992 Addison–Wesley, pp. 484–486.
Toru Kaneko, "Hierarchical Coding of Line–Drawing Data Described by the Chain–Code Sequence", *Systems and Computers in Japan*, vol. 18, No. 4, p. 53–62 (1987).
L. Vincent and P. Soille, "Watersheds in Digital Spaces: An Efficient Algorithm Based on Immersion Simulations", *IEEE Transactions on Pattern Analysis and Machine Intelligence*, vol. 13, No. 6, pp. 583–598 (Jun. 1991).
A. Montanvert, et al., "Hierarchical Image Analysis Using Irregular Tessellations", *IEEE Transactions on Pattern Analysis and Machine Intelligence*, vol. 13, No. 4, pp. 307–316 (Apr. 1991).
T. Westman, et al., "Color Segmentation by Hierarchical Connected Components Analysis with Image Enhancement by Symmetric Neighborhood Filters", *IEEE*, pp. 796–802 (1990).
T. Vlachos and A. G. Constantinides, "Graph–Theoretical Approach to Colour Picture Segmentation and Contour Classification", *IEEE Proceedings–I*, vol. 140, No. 1, pp. 36–45 (Feb. 1993).
R. Sedgewick, "Algorithms", Addison–Wesley Publishing Company, pp. 393–398.
P. S. Heckbert, "A Seed Fill Algorithm", pp. 275–277.
R. C. Gonzalez and P. Wintz, "Digital Image Processing", Addison–Wesley Publishing Company, pp. 336–338 (1977).

*Primary Examiner*—Joseph Mancuso
*Assistant Examiner*—Gerard Del Rosso

[57] ABSTRACT

An image processing system encodes a natural image into a segmented or mosaic image having well-defined edges and a residual image. The segmented image is encoded using a lossless encoding technique while the residual image is encoded using a lossy technique. This encoded image may be recorded on a video tape such that the segmented image may be recovered in picture-in-shuttle modes such as fast forward and fast rewind. In addition, the recorded image may be decoded and reencoded through several generational levels without experiencing significant degradation in perceived image quality. The segmented image is produced by an encoder which employs a multi-scale edge finder that is able to resolve transitions occurring over two, four and eight pixels into an edge located between two pixels. In addition, the lossless encoder includes circuitry which chain-encodes the segmented image into a low-resolution image and multiple complementary images such that the low-resolution image may be stored as a single data packet and, thus, recovered as a unit from the tape in picture-in-shuttle mode.

12 Claims, 27 Drawing Sheets

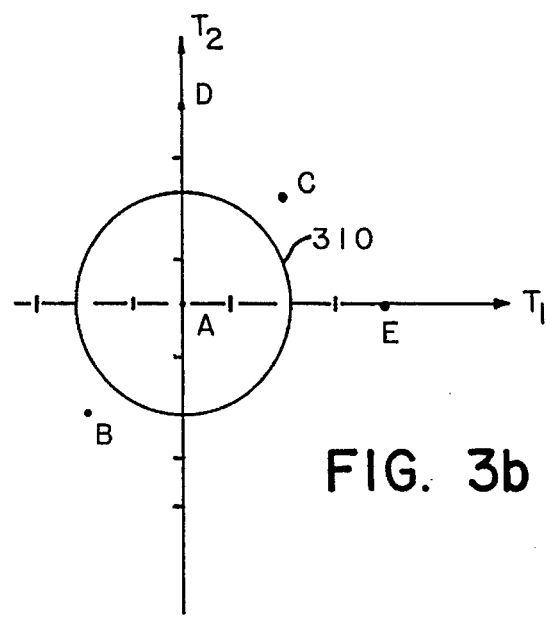
FIG. 3b
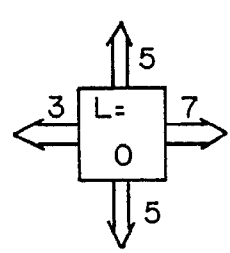 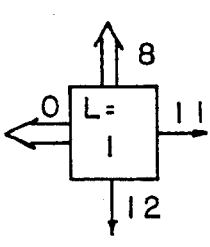 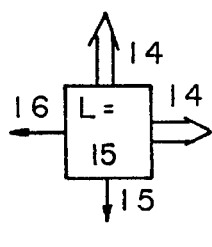 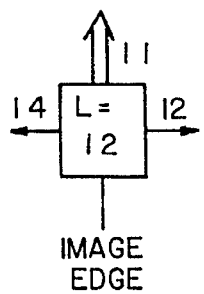
FIG. 4a  FIG. 4b  FIG. 4c  FIG. 4d
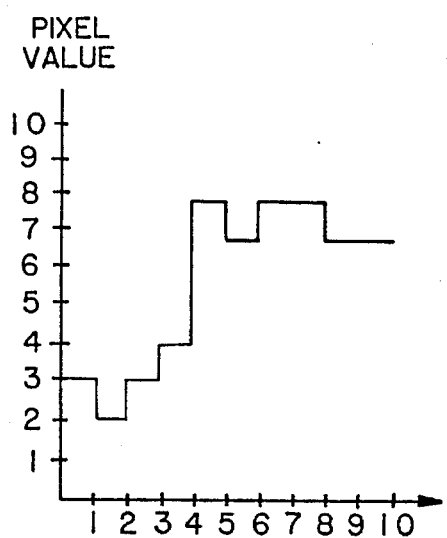 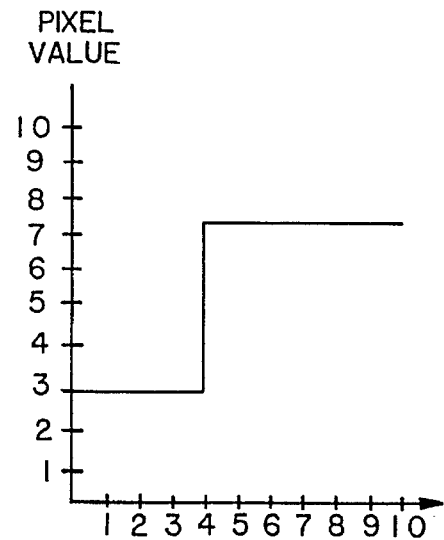
FIG. 5a  FIG. 5b

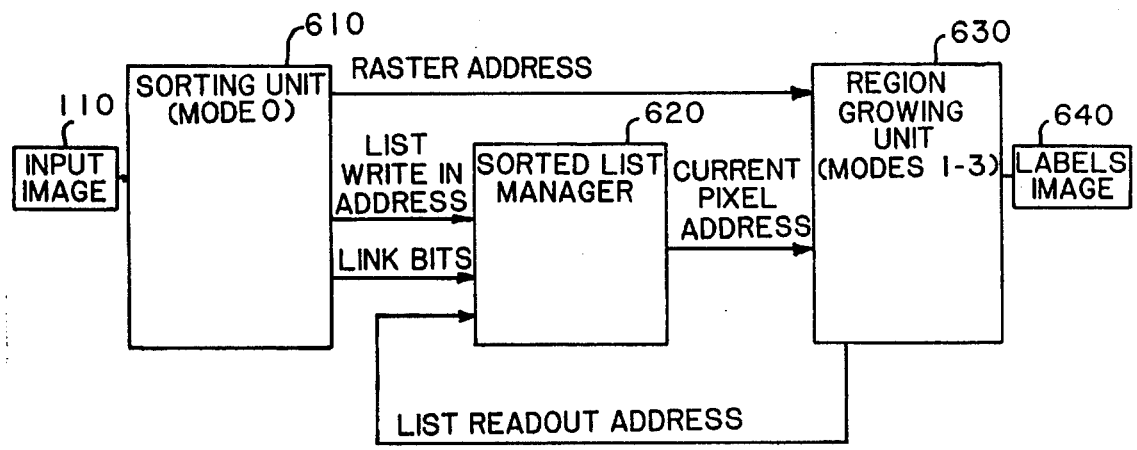
FIG. 6a
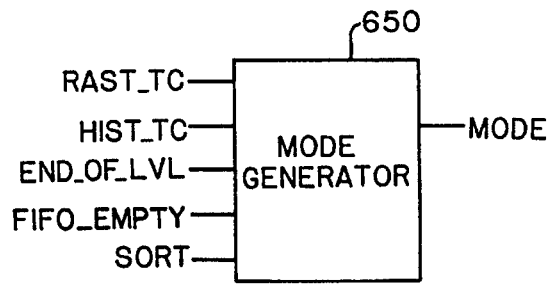
FIG. 6b
MODE STATE TABLE
| MODE | RAST_TC | SORT | HIST_TC | END_OF_LVL | FIFO_EMPTY | MODE +1 |
|------|---------|------|---------|------------|------------|---------|
| 0 | 1 | 1 | X | X | X | 1 |
| 1 | X | X | X | 1 | X | 2 |
| 2 | X | X | X | X | 1 | 3 |
| 3 | X | X | 0 | 1 | 1 | 1 |
| 3 | X | X | 1 | 1 | 1 | 0 |
FIG. 6c

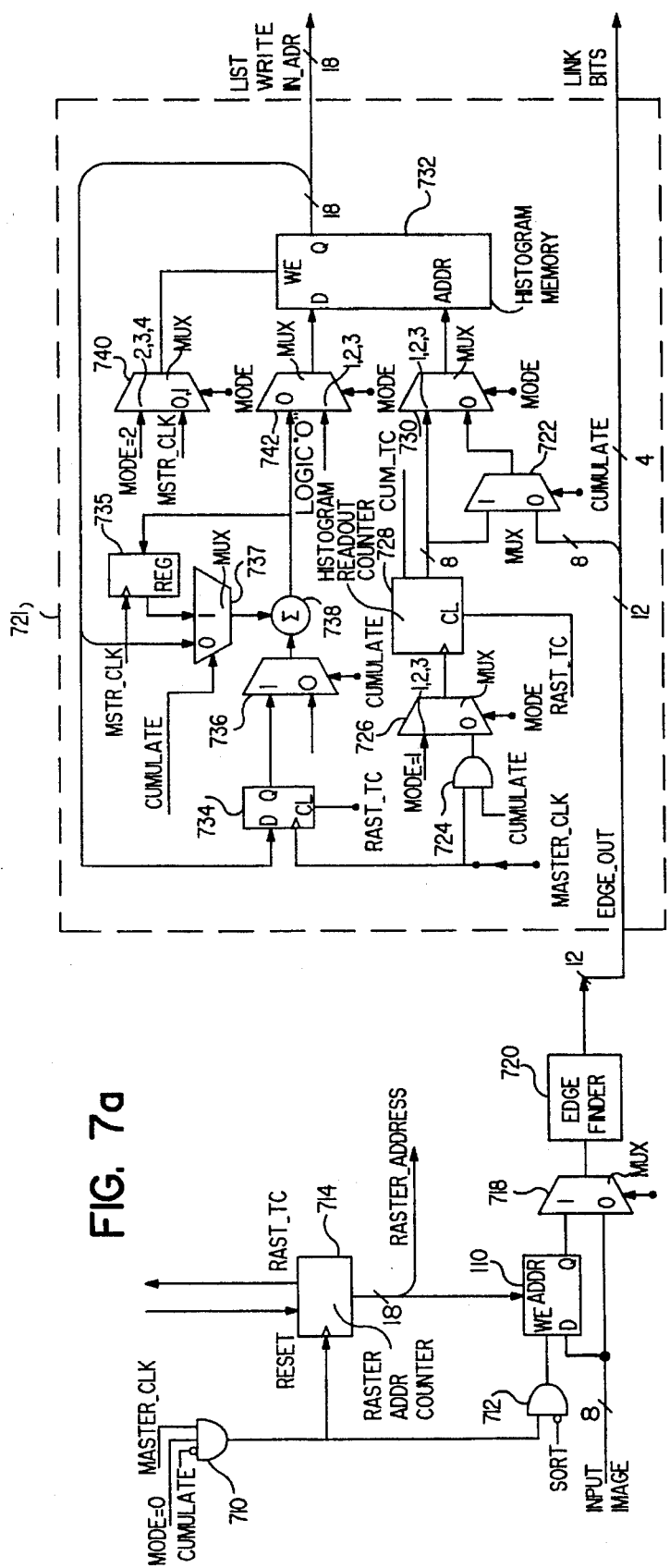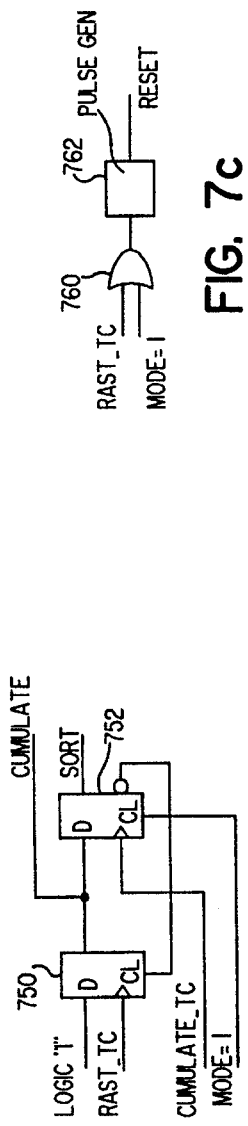
FIG. 7a
FIG. 7b
FIG. 7c

ROM MAP

```
A B C D E A B C D E...A B C D E
D E A B C D E A B C...D E A B C
B C D E A B C D E A...B C D E A
E A B C D E A B C D...E A B C D
C D E A B C D E A B...C D E A B
A B C D E A B C D E...A B C D E

.
      .
      .

A B C D E A B C D E...A B C D E
D E A B C D E A B C...D E A B C
B C D E A B C D E A...B C D E A
E A B C D E A B C D...E A B C D
C D E A B C D E A B...C D E A B
```

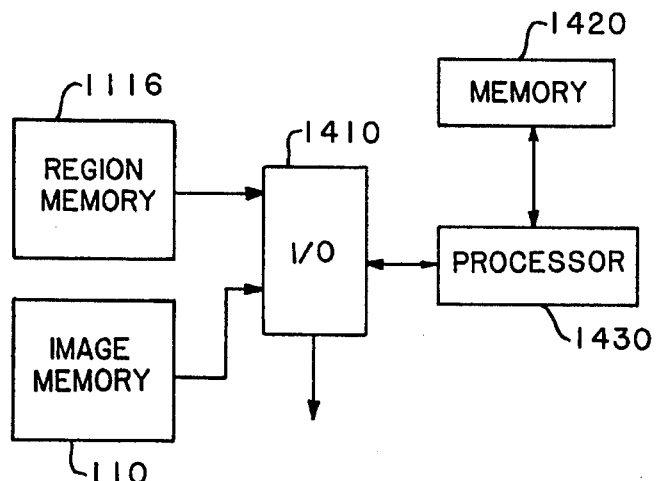

FIG. 14

```
    GRAPHICAL REGION
    MERGER(
 1    call CALCULATE REGION
 2         PROPERTIES
 3    call BUILD NEIGHBOR LISTS
 4    ---------------
 5    FOR n_iterations(
 6       call CALCULATE GRAPH
 7            LINK VALUES
 8       call SORT LABELS BY
 9            MINIMUM LINK
10       call MERGE REGIONS
11
12       overwrite labels table
13          (i.e., write newest region
14          nums into lookup table for
15          original region nums.)
16
17       if(not last iteration)
18          call REBUILD NEIGHBOR
19               LISTS
20
21    )end for
    )
```

FIG. 16

```
    CALCULATE REGION PROPERTIES
 1    FOR rasterscan(
 2       accumulate area,sum YUV,sum YUV2,
 3       max,min on a per region basis.
 4    ) end for
    )
```

FIG. 17

```
   ┌ BUILD NEIGHBOR LISTS(
 1 │   initialize all num_nbrs to zero
 2 │   initialize lutbuf to zero
 3 │
 4 │   FOR rasterscan(
 5 │     if pixel not "painted"(*it is a seed pixel*)
 6 │        change its sign to signify "painted"
 7 │        (*make next region*)
 8 │           assign a next region num
 9 │           point to next avail ofst,num_nbrs
10 │           call PAINT A REGION
11 │           update offset list and num_nbrs ptrs
12 │           clear marks in lutbuf,made by paint
13 │     ) endif
14 │   ) end for
15 │
16 │   FOR rasterscan(
17 │     change signs of painted pixels back to
18 │     positive
19 │   ) end for
   └ )
```

FIG. 18

```
   ┌ PAINT A REGION(
 1 │   (*Region painter using read & mark functions*)
 2 │     (*The read function processes region nbrs*)
 3 │        adds nbrs' regn nums to offset list
 4 │        increments num_nbrs for this region
 5 │        marks nbr region as used in lutbuf
 6 │     (*The mark function is a simple negation*)
 7 │        same as what is done to the seed pixel
   └ )
```

FIG. 19

```
   ┌ CALCULATE GRAPH LINK VALUES(
 1 │   FOR each region(
 2 │     FOR each nbr(
 3 │        call COMPUTE MERGE CRITERION
 4 │           (*value returned is link value*)
 5 │     ) end for
 6 │   ) end for
   └ )
```

FIG. 20

```
  SORT LABELS BY MINIMUM LINK(
1    FOR each region(
2       FOR each nbr(
3          find minimum link region
4       ) end for
5    ) end for
6    initialize histogram to zero
7    compute histogram,keep min and max vals
8    FOR each region(
9       place region pointer in sorted list
10   ) end for
  )
```

FIG. 21

```
  MERGE REGIONS(
1    FOR each link level(
2       call PRIME THE REGION FIFO
3       call GROW EXISTING REGIONS
4       (*uses COMPUTE MERGE CRITERION*)
5       call SEED NEW REGIONS & CLEANUP
6    ) end for
7    switch to new region properties buffer
```

FIG. 22

```
  PRIME THE REGION FIFO (
1    FOR each region in current edgeness level(
2       Assign the invalid (i.e.,active) label
3       FOR each neighbor region(
4          if (link to neighbor is set)
5             if (neighbor has valid label)
6                push region onto Fifo
7                (i.e. distance one nbr of exist regn)
8       ) end for
9    ) end for
  )
```

FIG. 23

```
GROW EXISTING REGIONS(
1     Set current distance to one.
2     push an End of Distance (EOD) Mark onto Fifo
3     FOREVER(
4        Pop a Region Pointer from Fifo
5        if(Pointer is EOD mark)
6           if(FifoEmpty)BREAK;
7           else
8              Push EOD Mark onto Fifo
9              Increment current distance
10             Pop a Region Pointer from Fifo
11
12       Get Popped Region's old label (to lookup neighbors)
13       Initialize minimum link strength to large number.
14
15       FOR each neighbor of popped region(
16
17          (*Region may get label from nbr*)
18          if([nbr dist<curr dist] & [nbr has a new label])
19             call COMPUTE MERGE CRITERION,
20                which returns a linkstrength(i.e.increase of MSE)
21             if([linkstrength < Threshold] &
22                linkstrength<minimum link strength])
23                   new popped region label = nbr label
24                   minimum link strength = linkstrength
25
26          (*Region may push nbr onto Fifo*)
27          else if([nbr dist-0]&[nbr is active(i.e.,has invalid label)]
28             Push pointer to neighbor onto Fifo
29             Assign current distance+1 to neighbor
30       ) end for
31
32       if(new label of popped region not invalid)
33          merge the winning nbr with the popped region
34    ) end forever
)
```

FIG. 24

```
    ┌  SEED NEWREGIONS & CLEANUP
 1  │     FOR each region in current edgeness level(
 2  │        set its distance to zero (cleanup)
 3  │        if(region does not have new label)
 4  │           push Region Pointer onto Fifo
 5  │           give Region the next new label
 6  │
 7  │           WHILE(Fifo not empty)(
 8  │              Pop Region Pointer from Fifo
 9  │              FOR each neighbor region(
10  │                 if(nbr does not have new label)
11  │                    call COMPUTE MERGE CRITERION,
12  │                       which returns linkstrength
13  │                    if(linkstrength<Threshold)
14  │                       Push neighbor region pointer onto Fifo
15  │                       Merge Neighbor with Popped Region
16  │              ) end for
17  │           ) end while
18  │
19  │        ) end if
20  │     ) end for
    └  )
```

FIG. 25

```
    ┌  COMPUTE MERGE CRITERION
 1  │     (*Criterion is weighted color difference of 2 regns*)
 2  │        Crit²=(area1*area2/(area1+area2)*
 3  │           [(deltaY²+deltaU²+deltaV²]
 4  │     Return [Crit,clipped to a max value] as
 5  │     linkstrength
    └  )
```

FIG. 26

```
   REBUILD NEIGHBOR LISTS (i.e. "new" regions)(
1    initialize all (new) num_nbrs to zero
2    initialize lutbuf to zero
3
4    FOR list_scan (
5      if region not painted(
6        change sign to signify painted
7        (*make next new region*)
8          assign next new region num
9          point to next avail new ofst,num_nbrs
10
11         push region onto stack
12         while(stack not empty)("paint new regn")
13           pop new region
14           FOR all neighbors(
15             if nbr same new region,
16               if nbr unpainted
17                 paint nbr by changing sign
18                 push nbr
19               else (i.e.,nbr is diff new region)
20                 set lutbuf
21                 add nbr region to new nbr list
22                 incrmnt num_nbrs of new regn
23               ) end_if/else
24           )endfor
25         )endwhile
26
27         update new offset list and num_nbrs ptrs
28         clear marks in lutbuf,made by painter
29     ) endif
30   ) end for
31
32   FOR list_scan (
33     change signs of painted regions back to positive
34   )
   )
```

FIG. 27

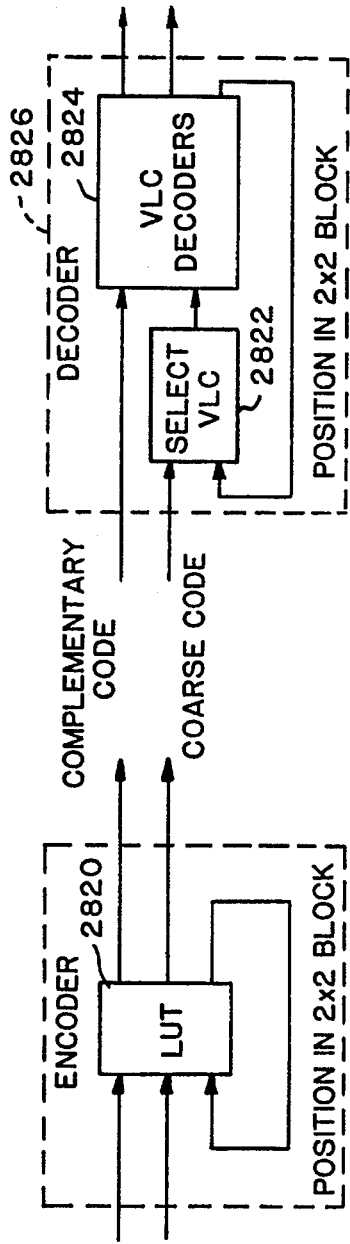
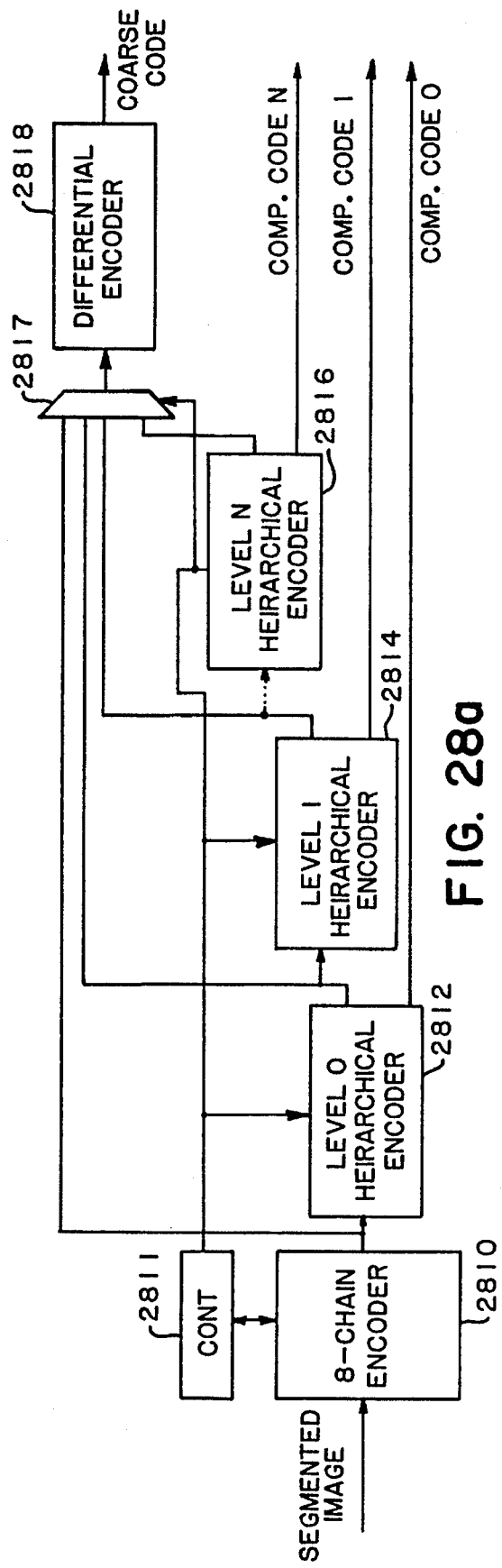
FIG. 28b
FIG. 28a

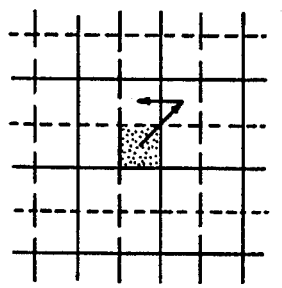 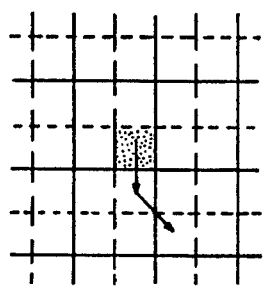 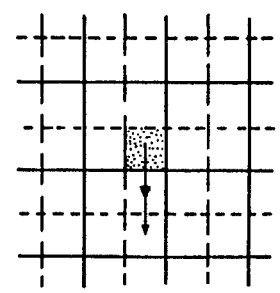
FIG. 28c   FIG. 28d   FIG. 28e
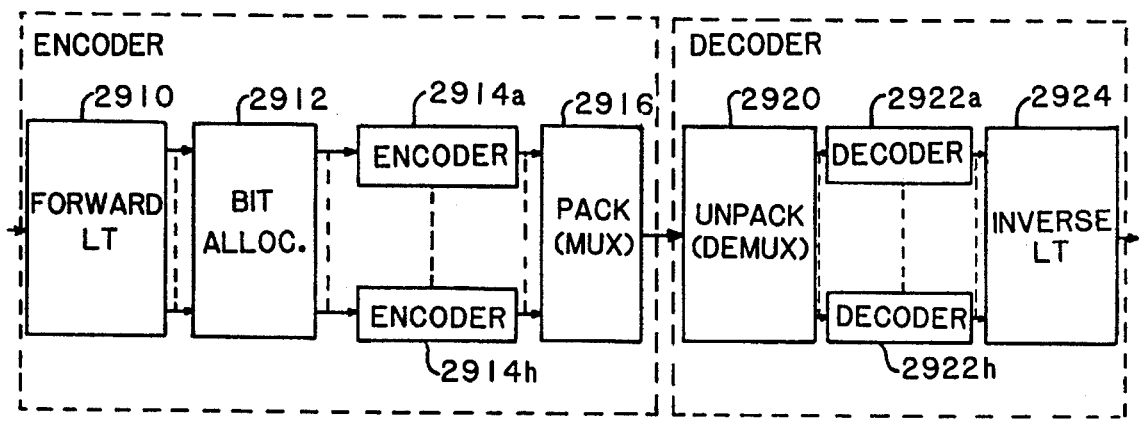
FIG. 29

SEGMENTATION BASED IMAGE COMPRESSION SYSTEM

FIELD OF THE INVENTION

The present invention is directed to an image compression system which uses a segmented base image and, in particular, to such a compression system which allows multi-generational copying.

BACKGROUND OF THE INVENTION

Image compression systems based on linear transforms such as the discrete cosine transform (DCT), sub-band coding, and wavelet transforms, have been extensively studied since the early 1970s. These compression systems fall into broad categories, Interframe systems and intraframe systems. An exemplary Interframe system is that developed by the Motion Picture Experts Group (MPEG). An exemplary intraframe system is that developed by the Joint Photographic Experts Group (JPEG). For the most part research on these image compression systems has been focused on applications such as multimedia and high definition television which require only single generation compression and decompression.

Recently a need has arisen for compression systems that can pass an image through the compression decompression cycle many times without appreciable degradation. This type of multi-generational compression and decompression is a severe test of any type of compression system because coding artifacts may be amplified in the higher generational copies. Several applications would benefit from a compression technique which would not exhibit degradation through multi-compression and decompression cycles. These include the editing a program recorded on a digital tape recorder, the distribution of video signals in a studio or network, and the compression of high definition television signals for recording on a digital tape recorder.

A particular goal for such an image compression system is to allow the recording of high definition television (HDTV) signals, which are provided in a format such as YUV422 format having 8 bits per sample or 16 bits per pixel, on an existing digital tape recorder such as a D3 or D5 recorder. To meet the bit rate requirements of a D3 or D5 recorder however, the HDTV signal would have to be compressed to have a bit rate of about 2-bits per pixel and 4-bits per pixel, respectively.

In addition, the compression system desirably should support standard and trick play modes in the forward and reverse directions and should also support a "picture-in-shuttle" mode in which a sped-up image is displayed during fast forward and reverse operations.

It is also desirable for the data to be able to be edited on a frame by frame basis. Editing operations of this type may be as simple as changing the contents of single frames, for example inserting text into an image. It may, however, involve more complex processing such as cutting between two scenes, inserting one image into a sequence of other images, and merging two or more scenes, as, for example, in a fade between two image sequences.

It is also desirable that such a data compression system allow an image sequence to be compressed and decompressed many times without significantly affecting its quality.

Finally, it is desirable for the compression system to operate in real-time or near real-time. This requirement implies that the image compression system be implemented either entirely in hardware or in a combination of dedicated hardware and software for a high speed general purpose image processing system.

These requirements, especially the requirements of frame-at-a-time editing and forward and reverse play at different speeds would be difficult, if not impossible, to implement using an Interframe coding system such as MEPG. Thus, the coder is desirably an intraframe coder which can achieve the desired compression ratio.

As described above, relatively efficient intraframe systems exist which are based on linear transforms. The JPEG compression system, for example, is based on discrete cosine transforms. Systems based on linear transforms, however, are not well suited for multi-generational compression and decompression. Linear transforms have difficulty compressing sharp edges. Consequently, these edges tend to blur and soften through multiple compression and decompression operations. In addition linear transforms introduce arithmetic round off errors and quantization errors. Consequently, the general signal to noise level tends to decrease during multi-generational compression and decompression due to the accumulation of these errors. In addition, spatial shifting due to editing may introduce new groupings of pixels that may prevent the numerical errors from stabilizing.

SUMMARY OF THE INVENTION

The present invention is embodied in a two-step hybrid compression system. The first step creates a rough but robust estimate of the image. This estimate is encoded so that it may be decoded without loss. This robust estimate serves to anchor the image against multi-generational degradation. Next a residual image is created by subtracting the robust estimate from the original image. This residual image is compressed using conventional linear transform techniques.

In the exemplary embodiment of the invention, the anchor image is a segmented image in which regions of a picture are modeled as areas of constant brightness and constant color. The system which generates this estimate includes apparatus that locates edges in the original image to produce a representation of the picture in which each pixel is encoded with the quality of its edges, that is to say, each pixel is encoded with a value indicating the degree to which it forms an edge in the image; this property is referred to as the "edgeness" of the pixel. The system processes this encoded image to reduce the number of edges through a combination of a pixel based operations. These operations sort lists of pixels by their edgeness. Following the pixel based operations, the system implements a graphical based operation which converts the image segments into nodes in a graph and combines nodes based on their edgeness.

BRIEF DESCRIPTION OF THE DRAWINGS

FIGS. 3a and 3b are graphical depictions of edge properties which are useful for describing the operation of the edge finder shown in FIG. 2.

FIGS. 4a, 4b, 4c, and 4d are diagrams of individual pixels showing details of how labels are assigned to the pixels by in the pixel-based processing circuitry shown in FIG. 2.

FIGS. 5a and 5b are graphical depictions of pixel value versus pixel position which are useful for explaining the operation of the pixel-based processing circuitry shown in FIG. 2.

FIG. 6a is a block diagram of circuitry suitable for use as the edge finder and pixel-based processing circuitry in FIG. 2.

FIG. 6b is a block diagram of control circuitry suitable for use with the pixel based segmenter shown in FIG. 6a.

FIG. 6c is a mode state table which is useful for describing the operation of the control circuitry shown in 6b.

FIGS. 7a, 7b and 7c are logic schematic diagrams, partly in block diagram form, of circuitry suitable for use as the sorting unit shown in FIG. 6a.

FIGS. 8a and 8b are logic schematic diagrams, partly in block diagram form, of circuitry suitable for use as the edge finder shown in FIG. 7a.

FIG. 9 is a block diagram of circuitry suitable for use as the sorted list manager shown in FIG. 6a.

FIGS. 10a, 10b and 10c are logic schematic diagrams partly in block diagram form which illustrate the operation of the pixel based segmenter shown in FIG. 6a.

FIGS. 11a, 11b, 11c and 11d are logic schematic diagrams, partly in block diagram form, of circuitry suitable for use as the region growing unit shown in FIG. 6a.

FIG. 11e is a logic schematic diagram partly in block diagram form of circuitry suitable for use as the neighbor address generator shown in FIG. 10a.

FIGS. 12a, 12b, 12c and 12d are flow chart diagrams which illustrate the operation of the seed/grow logic block shown in FIG. 10a.

FIG. 13 is a logic schematic diagram partly in block diagram form of circuitry suitable for use as the FIFO memory shown in FIG. 10a.

FIG. 14 is a block diagram of circuitry suitable for use as the graph based segmenter shown in FIG. 2.

FIG. 16 is a pseudo code listing of the GRAPHICAL REGION MERGER process block shown in FIG. 15.

FIG. 17 is a pseudo code listing of the CALCULATE REGION PROPERTIES process block shown in FIG. 15.

FIG. 18 is a pseudo code listing which illustrates the operation of the BUILD NEIGHBOR LISTS process block shown in FIG. 15.

FIG. 19 is a pseudo code listing which illustrates the operation of the PAINT A REGION process block shown in FIG. 15.

FIG. 20 is a pseudo code listing which illustrates the operation of the CALCULATE GRAPH LINK VALUES process block shown in FIG. 15.

FIG. 21 is a pseudo code listing which illustrates the operation of the SORT LABELS BY MINIMUM LINK process block shown in FIG. 15.

FIG. 22 is a pseudo code listing which lists the operation of the MERGE REGIONS process block shown in FIG. 15.

FIG. 23 is a pseudo code listing which illustrates the operation of the PRIME THE REGION FIFO process block shown in FIG. 15.

FIG. 24 is a pseudo code listing which illustrates the operation of the GROW EXISTING REGIONS process block shown in FIG. 15.

FIG. 25 is a pseudo code listing which illustrates the operation of the SEED NEW REGIONS AND CLEAN UP process block shown in FIG. 15.

FIG. 26 is a pseudo code listing which illustrates the operation of the COMPUTE MERGE CRITERION process block shown in FIG. 15.

FIG. 27 is pseudo code listing which illustrates the operation of the REBUILD NEIGHBOR LISTS process block shown in FIG. 15.

FIGS. 28a, 28b are block diagrams which illustrate the operation of the lossless coder shown in FIG. 1.

FIGS. 28c, 28d and 28e are diagrams of a portion of an image which are useful for describing the operation of the hierarchical coder shown in FIG. 28a.

FIG. 29 is a block diagram which illustrate the operation of the lossy coder shown in FIG. 1.

DETAILED DESCRIPTION

Overview

Figure 1:
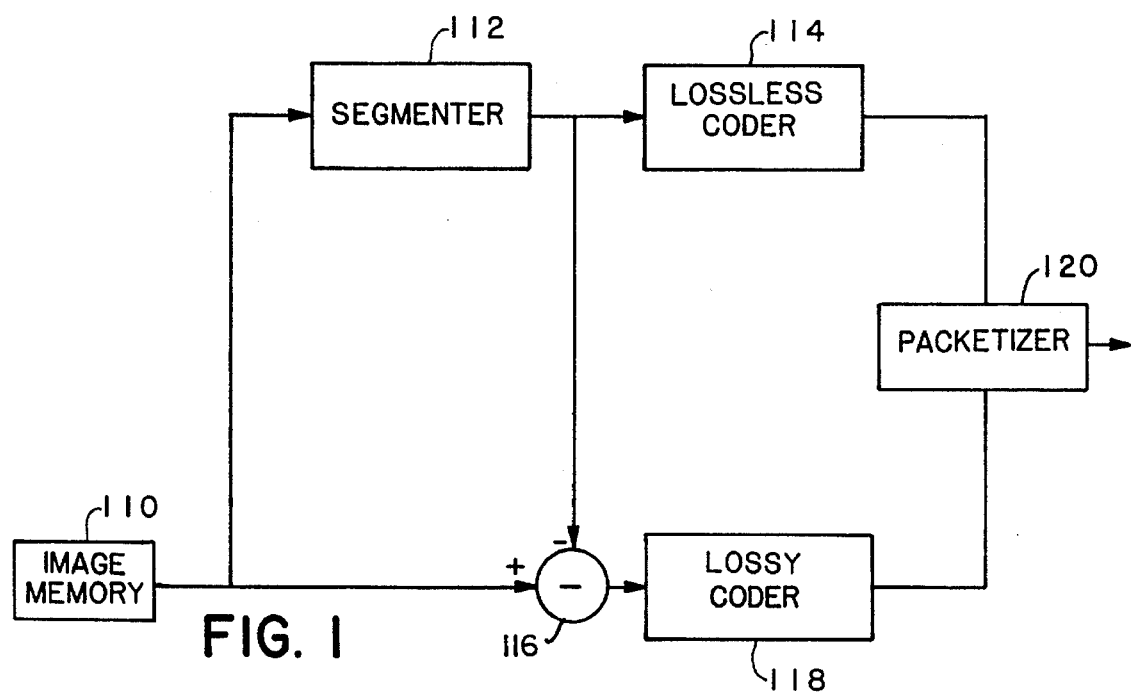
FIG. 1 is a block diagram of an image compression system in accordance with the present invention.

FIG. 1 is a block diagram which shows the basic components of a video data compressor according to the present invention. The compressor receives image frames from an image memory 110. In the exemplary embodiment of the invention, this data is provided in YUV422 format. This is a standard format providing 60 frames per second each frame having 1125 lines of pixels. The total data rate for this format is 1.2 Gbps.

In the system shown in FIG. 1, a segmented or mosaic image is calculated from the source image provided by the memory 110 in the segmenter 112. This mosaic image is encoded using a lossless coder 114, that is to say, circuitry which encodes the data without introducing any additional error, so that the data may be recovered in its original state without distortion.

The output data of the coder 114 is provided to a packetizer 120. The mosaic image applied to the coder 114 is also subtracted from the input image in a subtracter 116 to produce a residual image. The residual image is then encoded using a conventional lossy coder 118. The lossy coder 118 does not produce an error free encoding. It may add, for example quantization distortion to the residual image.

The output data of the lossy coder 118 is also applied to the packetizer 120. The packetizer 120 produces an encoded data image having a bit rate of less than 4 bits per pixel. The inventors have determined that this bit rate is suitable for recording the image on various existing digital recorders such as those which meet the D5 standard.

The concept upon which the hybrid system is based is as follows. The segmented image represents the base line quality of the image sequence. Because it is losslessly encoded, it is less susceptible to residual coding error accumulation due to multi-generational encoding and decoding operations. In addition at high shuttle speeds, it is not possible to retrieve all of the image data from the tape.

In these instances, only the data representing the segmented image is recovered and displayed. In the exemplary embodiment, the segmented image is hierarchically coded and only the coarse image levels are recovered during high shuttle speed operation. This segmented partial image provides sufficient detail for shuttle operation.

There are several advantages to this hybrid encoding technique. First, image segmentation is space invariant, a property not found in conventional linear transforms. Because of this, the performance of the encoding circuitry is less sensitive to editing steps involving displacements. Second, the segmented image retains all hard edges at their exact locations. This is advantageous for the multi-generational encoding and decoding operation because it allows edges to be produced faithfully in every generation. In addition, during picture in shuttle operations, such as fast forward and reverse, these preserved hard edges provide image details that a viewer can lock onto, giving the impression of a high quality image even at high playback speeds. Third, because the hard edges are encoded at the first stage of the encoding operations, they are absent from the second stage or residual image and, so, do not need to be processed by a linear transform algorithm. This allows greater freedom in designing the lossy residual encoder.

DETAILED DESCRIPTION OF THE EXEMPLARY EMBODIMENTS

In the exemplary embodiments of the invention described below, line arrows represent signal paths or data paths conveying single-bit or multi-bit data values. Where a signal path conveys multi-bit data values, a slash across the line and an adjacent number indicate the number of bits conveyed. Depending on the processing speed of the various elements in the exemplary embodiments, compensating delays may be required in some signal paths to ensure proper performance. One skilled in the art of designing digital signal processing circuitry would know where such delays would be needed.

There are two approaches to the segmentation problem: boundary detection and region growing. If all of the edge contours in an image are found then, implicitly, all regions in the image are found. By the same reasoning, if all regions in an image are found then all edge contours are implicitly found. Often, data from two approaches is combined resulting in a more robust algorithm.

Recently a new generation of segmentation algorithms has been proposed. These algorithms use an iterative edge enhancer/background smoother to produce regions that are easily segmented using conventional connected component analysis techniques. One such system is disclosed in a paper by T. Vlachos et al. entitled "Graph-Theoretical Approach to Contour Picture Segmentation and Contour Classification", *IEEE Proceedings-I*, Vol. 140, No. 1, pp. 36–45, February 1993. This paper describes a guided region grower which is based on edge strength ordering, that is to say one which merges pixel values with their most similar neighbors first.

A morphological technique known as "watersheds by flooding" produces high quality segmentation for images having segments which can be pre-marked. It severely oversegments natural images, however, which cannot be marked. A paper by L. Vincent et al. entitled, "Watersheds in Digital Spaces: An Efficient Algorithm Based on Immersion Simulations," *IEEE Transactions on Pattern Analysis and Machine Intelligence*, Vol. 13, No. 6, pp. 583–598, June 1991 describes such a system. This paper combines the watershed algorithm with a breadth-first search (BFS) strategy in an iterative approach to reduce oversegmentation of unmarkable images. The methods described in both of the above referenced papers use graphical representations of images to reduce the time needed to encode an image.

In compression for recording on video tape recorders each of these techniques appears to have certain shortcomings. Any iterative approach, such as that described in the paper by Vlachos et al., is computationally expensive and nondeterministic in time. The approach advanced in the paper by Vincent et al. is a single-pass segmentation algorithm which processes a seeded image. That is to say, one in which regions having a common pixel value have been identified prior to the segmentation processing. This algorithm, however, cannot deal with features which are one pixel in width or which have color data. In addition, it is unclear whether the morphological gradient operation can be used effectively in an iterative graphical algorithm.

A segmenter according to the present invention is built around a guided region growing technique based on the sorting of lists by edgeness (SOLE). The inventors have found that this technique produces good segmentation of color images with fine features. In addition the bit rate of the segmenter is easy to control and the technique is computationally efficient and deterministic in time due to its breadth-first implementation.

The first step in the segmentation process is to locate all edges in an image and to measure their strength. This process is performed by the edge finder 210, shown in FIG. 2. A particular implementation of the edge finder 210 is described below with reference to FIGS. 8a and 8b.

The SOLE region growing technique operates on this edge-strength image in four successive passes. In the first pass, a pixel based SOLE processor 212 combines ones of the labeled pixels produced by the edge finder to generate a labeled image in which each label corresponds to multiple pixels. Even though this labeled image has a reduced number of edges compared to the image produced by the edge finder, the inventors have determined that the cost of encoding this image and the residual image obtained by subtracting this labels image from the input image would be prohibitive.

In order to reduce the number of edges in the labels image to a more reasonable value, the segmenter processes the labeled pixel image produced by the pixel SOLE process 212 using a graphical SOLE process 214. The graphical SOLE process 214 operates in 3 passes. It converts the labeled pixel image provided by the pixel SOLE process 212 into a region graph 216. It then operates on the region graph according to SOLE processing techniques to produce a smaller region graph as its output.

It is noted that the three representations of the segmented image are interchangeable. The image starts out as a pixel matrix and is converted into a labels image by the edge finder 210 and pixel SOLE processor 212. The labels image is processed by the pixel SOLE processor 212 to produce a modified labels image. This modified labels image is then converted into a region graph by the graph SOLE processor 214. When the graphical SOLE 214 is complete, the region graph is transformed into a labels image for encoding purposes and into a mosaic image, by a lookup table, in order to generate the residual image.

It is also noted that the SOLE region growing technique is not iterative. The number of passes is fixed and relatively small and the cost of successive passes decreases rapidly so that the overall computational complexity remains O[n]. The inventors have determined that the SOLE processing algorithm is completely stable after seven passes. The improvement caused by the last three passes, however is insignificant. Accordingly, these passes have been eliminated.

Both the pixel SOLE process and the graphical SOLE process make decisions to merge colored areas—either pixels or graphical regions—based on the value of the "link" connecting the areas. In the exemplary embodiment of the invention this link value indicates the strength of the edge between the two areas relative to a predetermined threshold. To simplify the description, this edge strength value is referred to as "edgeness". In general, a large edgeness value is less favorable for merging two areas than a small edgeness value. It is important to note that in geometrical terms, the edgeness is located between the two areas rather than being co-located with either area.

For the pixel based SOLE process 212 the edgeness map is separate from the image and contains twice the data of the image. Each pixel value has four links to adjacent pixel values. Each link is shared by two pixels, thus the number of links is twice the number of pixels. The edgeness value between two pixels is calculated using a multi-scale edge strength operator which locates both soft edges, i.e., edges having a width between 4 and 8 pixels, and hard edges, edges which clearly occur between 2 pixel positions.

In the pixel SOLE algorithm, pixels are divided into two categories, interior pixels and edge pixels. The division is based on a simple criterion, the maximum edgeness of the four links of each pixel. The first step in the algorithm connects the interior pixels into seed regions. Next a more complicated technique is used to assign the remaining pixels to respective seeded portions of the image. Finally, the pixel values in each region are averaged to define a single value for the entire region. The result of the pixel SOLE process is a mosaic of regions of constant color. The inventors have determined, from statistical studies, that the average-size region in a pixel mosaic image contains about ten pixels. Encoding such regions losslessly, however, does not reduce the bit rate sufficiently to meet the data rate requirements of existing digital recorders such as those conforming to the D4 standard. Accordingly, the graphical SOLE process is applied to the image produced by the pixel SOLE process to produce the segmented image which is losslessly encoded by the encoder 114, shown in FIG. 1.

Figure 2:
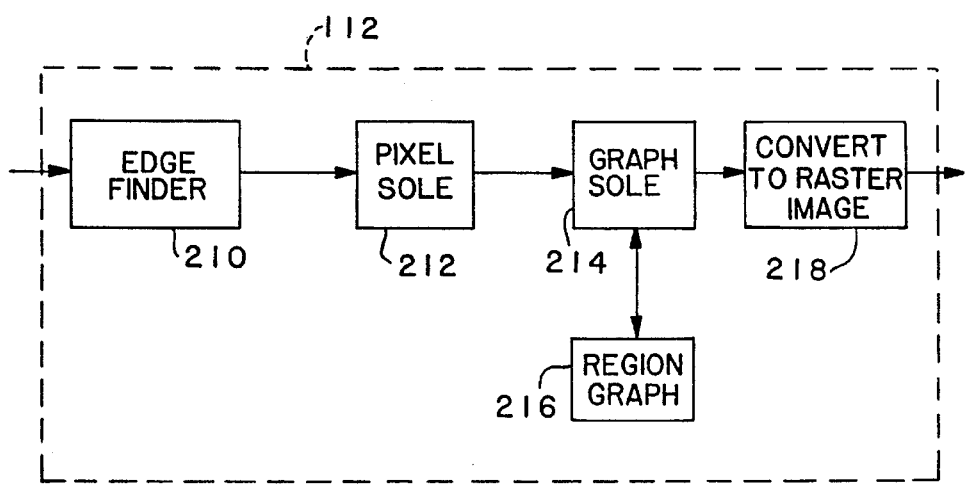
FIG. 2 is a block diagram showing details of the segmenter shown in FIG. 1.

In the graphical SOLE process 214, shown in FIG. 2, the measurement of edgeness is not as straightforward. There is no easy way to define a multi-scale operator for graphical areas which would operate in the same manner as the multi-scale operator for the pixels. Thus, the edgeness for the graphical SOLE process is simply the color difference between adjacent regions. Consequently, in the exemplary embodiment of the invention, the pixel-based SOLE processor may be considered as the edge-finder for the graphical SOLE processor.

In the graphical SOLE processor, each region is defined by a data structure which contains a list of neighbors and a list of all of the edgeness values of the respective links to those neighbors. From conventional graph theory it is known that the upper bound for the number of links needed to represent an image is approximately six times the number of vertices.

The general flow of the graphical SOLE process 214 is similar to that of the pixel SOLE process 212. There is, however, an additional step of producing a region connectivity graph before each of the three passes of the graphical SOLE process. In addition, the graphical SOLE process operates on the link information differently than the pixel SOLE process. Since there is no multi-scale edge finder for the graphical SOLE process, it is possible for soft edges in the graphical representation to effectively disappear. To prevent this from occurring the graphical SOLE process 214 updates region parameters and performs explicit comparisons prior to merging any two regions. These comparisons guarantee that regions having properties which have been significantly altered by previous merges are not mismerged on the basis of their original properties.

The inventors have determined that each pass of the graphical SOLE process 214 reduces the number of areas in the graph approximately by a factor of four. Hence, the execution time for multiple passes is strongly bounded. Furthermore, the inventors have determined that with three iterations of the graphical SOLE process, the segmentation of the image is reduced to an extent that its boundaries can be encoded at a cost in the range of 0.2 to 1.2 bits per pixel for natural images. The precise value of the cost depends on the image content.

FIG. 6a is an overview of the edge finder 210 and pixel SOLE processor 212, shown in FIG. 2. The system shown in FIG. 6a operates in four modes, numbered 0 through 3. In mode 0, the input image, provided by the memory 110, is processed by a sorting unit 610, which includes the edge finder 210. The edge finder 210 assigns, to each pixel position in the image, a minimum link value representing the smallest difference between the pixel value for that pixel position and each of its immediate neighboring pixel values. In addition, the sorting unit generates a sorted list of pixel addresses in the image memory 110. This list, which is stored in a list memory in the sorted list manager 620, is ordered by the minimum link value of the image pixels. The sorting unit 610 is described below with reference to FIGS. 7a, 7b and 7c, the edge finder 210 is described in detail below with reference to FIGS. 8a and 8b and the sorted list manager 620 is described below with reference to FIG. 9.

The sorted image held by the sorted list manager 620 is processed by the region growing unit 630. The region growing unit performs three passes on each gray level in the sorted list to produce a labels image, which is stored in a memory 640. The labels image is a transformed version of the original image in which many of the image areas—which had been separated by the edges found by the image finder 210—have been combined and the corresponding pixel values of the combined areas have been replaced by the average value over the entire area. The labels image is the output image of the pixel SOLE processor 212. As shown in FIG. 2, it is this image which is passed to the graph SOLE processor 214. The graph SOLE processor 214 is described in detail below with reference to FIGS. 15 through 27.

Figure 6D:
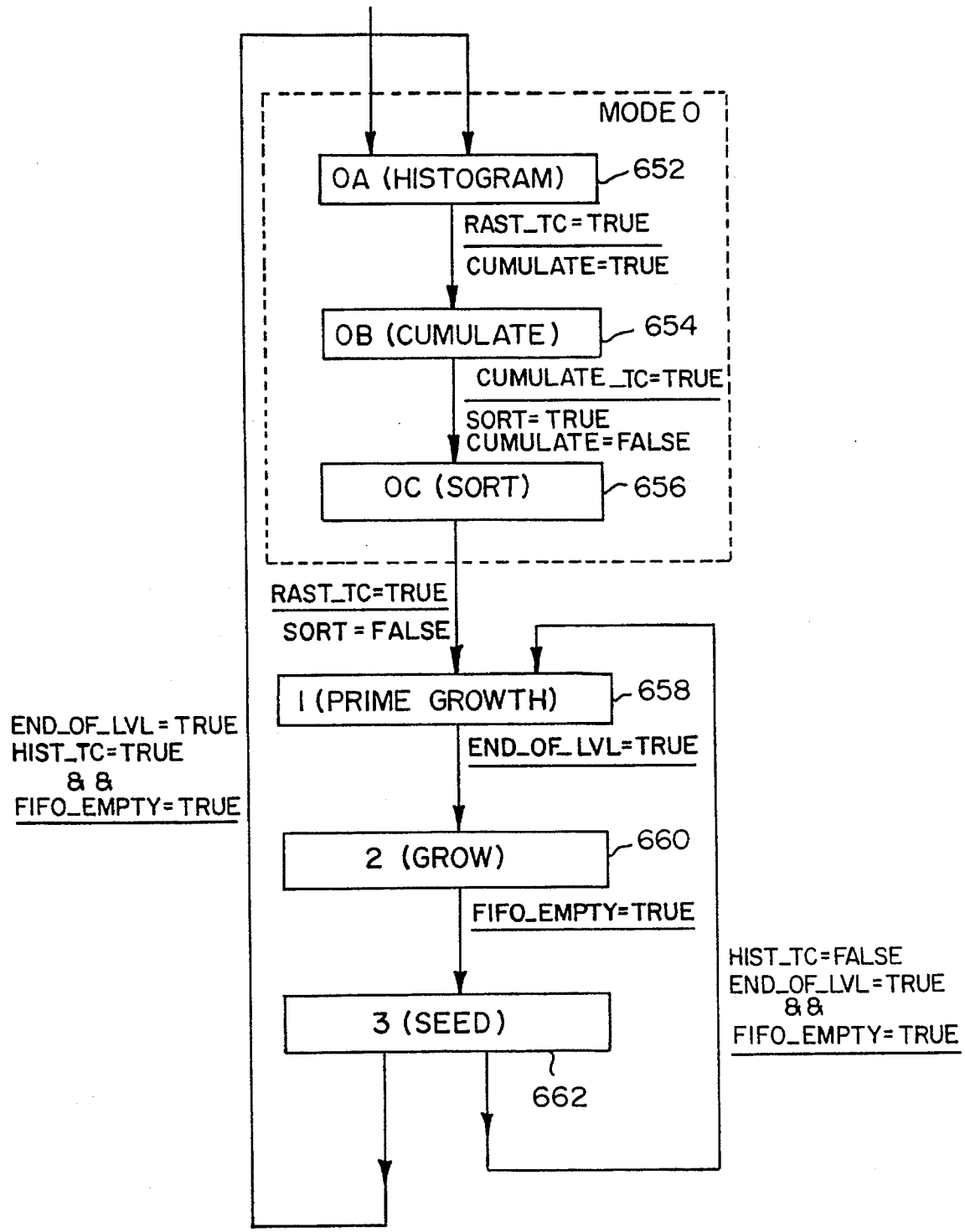
FIG. 6d is a state diagram which useful for explaining the operation of the circuitry shown in FIG. 6b.

The signals which control the mode in which the system shown in FIG. 6a is operating are determined by a mode generator circuit, as shown in FIG. 6b. This circuit receives the signals RAST_TC, HIST_TC, END_OF_LVL, FIFO_EMPTY and SORT and produces the signal MODE which controls the operational mode of the circuitry shown in FIG. 6a. In mode 0, the input image is processed by the edge finder 210, sorting unit 610 and sorted list manager 620. In modes 1, 2 and 3, the image held by the sorted list manager 620 is processed by the region growing unit 630. The generation of the signals RAST_TC, HIST_TC, END_OF_LVL, FIFO_EMPTY and SORT are described below. The operation of the mode generator circuit 650 is described by the mode state table of FIG. 6c and by the state transition diagram of FIG. 6d.

FIGS. 5a and 5b illustrate the operation performed by the segmenter, in one dimension. FIG. 5a represents an input image containing several small transitions and one large transition. The edge finder recognizes the large transition. The pixel SOLE processor combines some of the smaller transitions and the graph SOLE processor combines the remaining smaller transitions. The result of this operation is shown in FIG. 5b. The regions containing the small transitions are replaced by their average value and only the large transition remains.

The operation of the edge finder 210 and pixel SOLE processor 212 are described in an overview section, which summarizes the operation of the circuitry, and then in detail with reference to the specific drawing Figures. The individual circuits are described at two levels, first structurally, with reference to one or more of FIGS. 7a, 7b, 7c, 8a, 8b and 9, and then functionally with reference to FIGS. 10a, 10b and 10c for each of the three stages of the mode 0 operation.

In the exemplary embodiment of the invention, the edge finder 210, shown in FIG. 2, assigns, to each image pixel, a minimum link value which holds the value of the smallest difference between the pixel value and each of its four neighboring pixel values (right, left, up and down). If the edge finder 210 determines that an edge does not exist between two adjacent pixel positions using the four- or eight-pixel windows, it assigns a value of zero for the edge value produced using the respective window. The two-pixel window of the edge finder always produces a value representing the difference between adjacent pixel values.

If, using the four- or eight-pixel windows, the edge finder determines that a soft edge does exist between the two adjacent pixels, then the edge finder assigns the largest edge value from among those determined by the two-, four- and eight-pixel windows for the particular link of the pixel. As a final step, the edge finder assigns a value equal to one plus the smallest of the four links as the minimum link value for the pixel. If, however, all of the links of the pixel are less than a preset threshold, the edge finder sets the minimum link value to zero. The edge finder provides, as its output values, this minimum link value and a four-bit value which indicates whether the pixel has links which are less than the threshold. These four-bits are the link-bits for the pixel. The link-bit is set for each link which has an edgeness value that is less than the threshold. If the minimum link value of the pixel is zero, all four of the link bits are set.

The assignment of the link-bits is illustrated in FIGS. 4a through 4d. Pixels are classified into two groups: interior pixels and edge pixels. This classification is made by the edge finder circuit 210 based on an edge threshold value. If all of the links of a pixel are less than this threshold value, then all four link bits for the corresponding pixel are set to logic-1 and the pixel is assigned an edge-strength value of zero. This is illustrated in FIG. 4a. In this example, the threshold value is ten.

Since all of the links in the pixel shown in FIG. 4a are less than 10, the edge-strength for the pixel is set to zero even though the smallest link value is three. This marks the pixel as an interior pixel. As shown in FIG. 4b, if a pixel has any edge strength values greater than the threshold it is marked as an edge pixel. An edge pixel is one which has at least one zero-valued link-bit. In FIG. 4b, the pixel has two edges greater than the threshold and two edges less than the threshold. In this instance, the link bits of the pixel are set to indicate which two edges are less than the threshold and the edge strength value of the pixel is set to one plus its smallest link value. For this pixel, since the smallest link value is zero, the minimum edge strength is set to one.

FIG. 4c illustrates the circumstance when an image pixel does not have any link values which are less than the threshold. As described below, if all of the link-bits are reset, this pixel cannot be combined with any other pixels in the image. Accordingly, for the pixel shown in FIG. 4c, the link bit or link bits corresponding to the smallest link value (14) are set even though this value is greater than the threshold value of ten. This smallest link value is also used to set the edge-strength value for the pixel. This value is set to one plus the smallest link value or 15. By setting at least one of the link-bits, the pixel is assured of being attached to at least one other pixel in the image.

FIG. 4d shows how a pixel at the edge of the image is handled. In this instance, the image edge is treated as having an infinite value. The link to the image edge cannot be the edge-strength value for the pixel nor can its link-bit be set.

The pixels in the image are sorted by their minimum link values, as provided by the edge finder, in a three-stage operation. In the first stage, a histogram is generated in which the number of pixels at each possible link level is counted. Next in the second stage, the numbers of pixel values at each level are accumulated such that the number stored in each addressed cell of the histogram memory represents the number of pixels having values which are less than the corresponding address value of the histogram memory. Finally, in the third stage, the input image is again processed by the edge finder and, as each pixel is processed, its address and link indicators are stored in a list memory using an address that is determined by incrementing the corresponding value in the histogram memory. At the end of this operation, the list memory holds a list of all of the pixel addresses in the image, sorted by their minimum link values. As an alternative to processing the image twice through the edge finder, the result of the first-stage processing may be stored in a memory for use during the third-stage processing.

PIXEL—BASED SEGMENTER

FIG. 6a is an functional block diagram of the pixel-based segmenter which includes the edge finder 210 and pixel SOLE processor 212, shown in FIG. 2. The system shown in FIG. 6a operates in four modes, numbered 0 through 3. In mode 0, the input image, provided by the memory 110, is processed by a sorting unit 610, which includes the edge finder 210. The edge finder 210 assigns, to each pixel position in the image, a minimum link value representing the smallest difference between the pixel value for that pixel position and each of its immediate neighboring pixel values. In addition, the sorting unit generates a sorted list of pixel addresses as they occur in the image memory 110. This list, which is stored in a list memory in the sorted list manager 620, is ordered by the minimum link value of the image pixels. The sorting unit 610 is described below with reference to FIGS. 7a, 7b and 7c, the edge finder 210 is described in detail below with reference to FIGS. 8a and 8b and the sorted list manager 620 is described below with reference to FIG. 9.

The sorted image held by the sorted list manager 620 is then processed by the region growing unit 630 in three passes (modes 1, 2 and 3) to produce a labels image, which is stored in a memory 640. The labels image is a transformed version of the original image in which many of the image areas, which were separated by the edges found by the image finder 210, have been combined. In this image, the corresponding pixel values of the combined areas have been replaced by the average over the entire area. The labels image is the output image of the pixel SOLE processor 212. As shown in FIG. 2, it is this image which is passed to the graph SOLE processor 214. The graph SOLE processor 214 is described in detail below with reference to FIGS. 15 through 27.

The circuitry which generates the histogram is shown in FIGS. 7a, 7b and 7c. In FIG. 7a, an AND gate, 710 generates a clock signal for a raster address counter 714. The AND gate 710 applies the clock signal MASTR_CLK to the counter 714 when the mode signal, provided by the mode generator 650, indicates mode 0 and the signal CUMULATE, developed by the circuitry shown in FIG. 7b as described below, is logic-zero. The counter 714 generates a signal RASTER_ADDRESS which is used in the first and third stages of the pixel sorting operation, and a signal RAST_TC which is used by the control circuitry described below with reference to FIG. 7b. As described below, with reference to FIG. 11a, the signal RASTER_ADDRESS is also used to store the link bits for each addressed pixel into the region memory during mode 0.

The signal RASTER_ADDRESS is applied to the address input port of the image memory 110. As the image is received, it is stored into the memory 110 at addresses indicated by the RASTER_ADDRESS signal. The write enable (WE) signal for the memory 110 is generated by an AND gate 712, responsive to the clock signal provided by the AND gate 710 and the inverse of the signal SORT, described below with reference to FIG. 7b.

As an input image is written into the memory 110, during the first stage of processing by the sorting unit 610, it is also passed by the multiplexer 718 to the edge finder 720 in response to the signal SORT being logic-zero.

EDGE FINDER

In the exemplary embodiment of the invention, each image pixel is defined as having four links to adjacent pixels to the left, right, above and below the image pixel. Each of these links may define a one dimensional edge between the pixel and the corresponding adjacent pixel. Thus, the description of the edge finder algorithm can be in terms of a one dimensional sequence of values without any loss of generality.

As described above in the exemplary embodiment of the invention, an edge is defined as existing between two pixel positions. Because the edges are defined in this way, the present invention can easily handle images having relatively fine features, for example, lines having a width of only 1 pixel. Since the edge finder uses a multi-scale implementation, it performs well on both sharp and diffuse boundaries in the image.

Measuring edges in a noise free image having very crisp edges, such as an animated frame, is a trivial problem. Edges in this type of image may be located using a simple pixel-by-pixel difference calculator. This calculator will produce relatively large edge values at the sharp region transitions.

In most natural pictures, however, many of the edges are not very sharp. Thus, it often takes several pixel positions to transfer from one more or less homogeneous region to another. These soft edges may be the result of motion blur, out of focus blur of background objects, or gradual changes in illumination or reflection. Consequently, an edge measurement technique that considers gray value or color difference values only between pairs of neighboring pixels is not sufficient to identify edges in most natural images.

The edge finder 210 addresses this problem by determining edges in 2 pixel, 4 pixel and 8 pixel windows surrounding the target pixel. The edge value that is assigned to the particular link being measured is the largest edge value found using the 2 pixel, 4 pixel and 8 pixel windows.

In the case of color pixels, each pixel can be represented by a vector that includes 3 components, a luminance component, Y, and two color difference components, U and V. Thus, a pixel, $X_i$, at position I is represented by equation (1).

$$x_i = \begin{bmatrix} y_i \\ u_i \\ v_i \end{bmatrix} \quad (1)$$

The color edge height, $H_i$ between pixel $x_i$ and pixel $x_{i+1}$ is defined by equation (2)

$$H_i = \sqrt{(y_{i+1} - y_i)^2 + (u_{i+1} - u_i)^2 + (v_{i+1} - v_i)^2} \quad (2)$$

It is this edge height value, $H_i$, of the two pixel window which is compared with corresponding edge height values for four- and eight- pixel windows centered about the target edge, to determine the value of the edge between pixels $x_i$ and $x_{i+1}$.

In order to determine whether an edge exists in a group of four pixels the present invention normalizes the pixel data in the four-pixel window with respect to absolute level and range to produce two parameters having only two degrees of freedom. To simplify the description, the algorithm is described below in terms of scalar pixel values, that is to say, having only a luminance component. The algorithm is then extended to pixel vectors. Given four sequential data points $X_0$, $X_1$, $X_2$ and $X_3$, the absolute gray level of the pixels is removed by subtracting $X_0$ from each of the pixel values $X_1$, $X_2$ and $X_3$. In addition, the range of the pixel values is normalized as shown in the equations (3) which define the two parameters, $t_1$ and $t_2$.

$$t_1 = (x_1 - x_0)/(x_3 - x_0) \quad (3)$$

$$t_1 = (x_2 - x_0)/(x_3 - x_0)$$

As shown in the equations (3), two free parameters, $t_1$ and $t_2$, can fully describe the shape of a one-dimensional image transition in four pixel window.

If we assume that a perfect linear edge would be represented by values 0, ⅓, ⅔ and 1, we can change the parameters $t_1$ and $t_2$ to represent deviations from the ideal edge, as shown in the equations (4).

$$t_1 = (x_1 - x_0)/(x_3 - x_0) - 1/3 \quad (4)$$

$$t_2 = (x_2 - x_0)/(x_3 - x_0) - 2/3$$

If the sign of the parameter $t_2$ is changed, the equations (4) may be rewritten as the equations (5).

$$t_1 = (x_1 - x_0)/(x_3 - x_0) - 1/3 \quad (5)$$

$$t_2 = (x_3 - x_2)/(x_3 - x_0) - 1/3$$

The two parameters, $t_1$ and $t_2$, defined by the equations (5) are symmetrical with respect to each other. Consequently, if the order of the data sequence $x_0$, $x_1$, $x_2$ and $x_3$ is reversed, the two variables $t_1$ and $t_2$ will be reversed. For this reason, and because the equations (5) can readily be extended to color pixels, the inventors have chosen the equations (5) for edge representation.

Figure 3A:
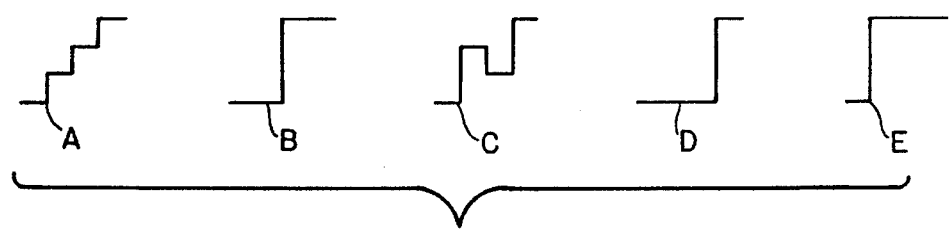

In order to determine if an edge is centered in a four-pixel window, the relative values of the four pixels in the window are desirably classified as to whether they represent an edge or do not represent an edge. Some of the possible data configurations which may be considered for edge classification are shown in FIG. 3a. In this figure, the configuration A represents a soft edge (i.e. linear ramp). Configuration B represents a hard edge, configuration C represents a questionable soft edge and configurations D and E represent shifted hard edges. Ideally, the multi-scale edge finder should recognize configurations A and B as having an edge exactly in the center of the window. The hard edge in configuration B will be recognized by the two-pixel window edge finder, whereas the soft edge A will desirably be recognized by the four-pixel window edge finder. Configuration C is questionable and, so, may be interpreted as not defining an edge centered in the four-pixel window. Finally, neither configuration D nor configuration E should be recognized as a centered edge using the four-pixel window.

Using the equations (5) to define the edge features, a specific area may be defined in the two dimensional space spanned by $(t_1, t_2)$. Ordered pairs of the values $t_1$ and $t_2$ which fall within this area are considered to define an edge recognized by the four-pixel window while ordered pairs which fall outside of the area are considered not to define an edge. An area of this type is defined as shown in FIG. 3b. The circular area of radius R, shown in FIG. 3b is defined by equation (6).

$$R >= \sqrt{t_1^2 + t_2^2} \qquad (6)$$

The edge definition area shown in FIG. 3b is used in the exemplary embodiment of the invention. It is contemplated, however, that the shape of the region may be changed to fit other validation criteria for a four-pixel window edge. Changing or refining the region shape can thus be considered a fine tuning process for the edge finder algorithm.

Pairs of edge defining values which fall outside of the edge definition area are assigned a height value, H, of zero. If the values for a four-pixel sequence fall within the edge defining area, they are assigned an edge height value, H, defined by equation (7).

$$H = |x_3 - x_0| \qquad (7)$$

The edge height value for the four-pixel window is defined as an absolute value since, for use in segmentation, the direction of an edge—either up or down—is irrelevant.

The analysis set forth above has considered pixel values as being scalars, for example, as may be found in a monochrome image. If the edge definition algorithm is extended to pixel vectors, as described above for a color image, the edge defining values $t_1$ and $t_2$ are defined by the equations (8) and (9).

$$t_1 = \|x_1 - (x_0 + (1/3)(x_3 - x_0))\|/\|(x_3 - x_0)\| \qquad (8)$$

$$t_2 = \|x_2 - (x_0 + (2/3)(x_3 - x_0))\|/\|(x_3 - x_0)\|$$

or, equivalently $$t_1 = \|2x_0 - 3x_1 + x_3\|/\|3(x_3 - x_0)\| \qquad (9)$$

$$t_2 = \|x_0 - 3x_2 + 2x_3\|/\|3(x_3 - x_0)\|$$

and the height of the edge is defined by the length of the difference vector $x_3 - x_0$, which may be written in its vector components as shown in equation (10).

$$H = \sqrt{(y_3 - y_0)^2 + (u_3 - u_0)^2 + (v_3 - v_0)^2} \qquad (10)$$

The edge finder algorithm may also be extended to an eight-pixel window. In this instance, the test for whether a set of eight-pixel values defines an edge is given by equation (11)

$$R >= \sqrt{t_1^2 + t_2^2 + t_3^2 + t_4^2 + t_5^2 + t_6^2} \qquad (11)$$

where the values $t_1$ through $t_6$ are defined by the equations (12).

$$t_1 = \|x_1 - (x_0 + (1/7)(x_7 - x_0))\|/\|(x_7 - x_0)\| \qquad (12)$$

$$t_2 = \|x_2 - (x_0 + (2/7)(x_7 - x_0))\|/\|(x_7 - x_0)\|$$

$$t_3 = \|x_3 - (x_0 + (3/7)(x_7 - x_0))\|/\|(x_7 - x_0)\|$$

$$t_4 = \|x_4 - (x_0 + (4/7)(x_7 - x_0))\|/\|(x_7 - x_0)\|$$

$$t_5 = \|x_5 - (x_0 + (6/7)(x_7 - x_0))\|/\|(x_7 - x_0)\|$$

$$t_6 = \|x_6 - (x_0 + (6/7)(x_7 - x_0))\|/\|(x_7 - x_0)\|$$

the height, H, of the eight-pixel window is defined by equation (13)

$$H = \sqrt{(y_7 - y_0)^2 + (u_7 - u_0)^2 + (v_7 - v_0)^2} \qquad (13)$$

Figure 8A:
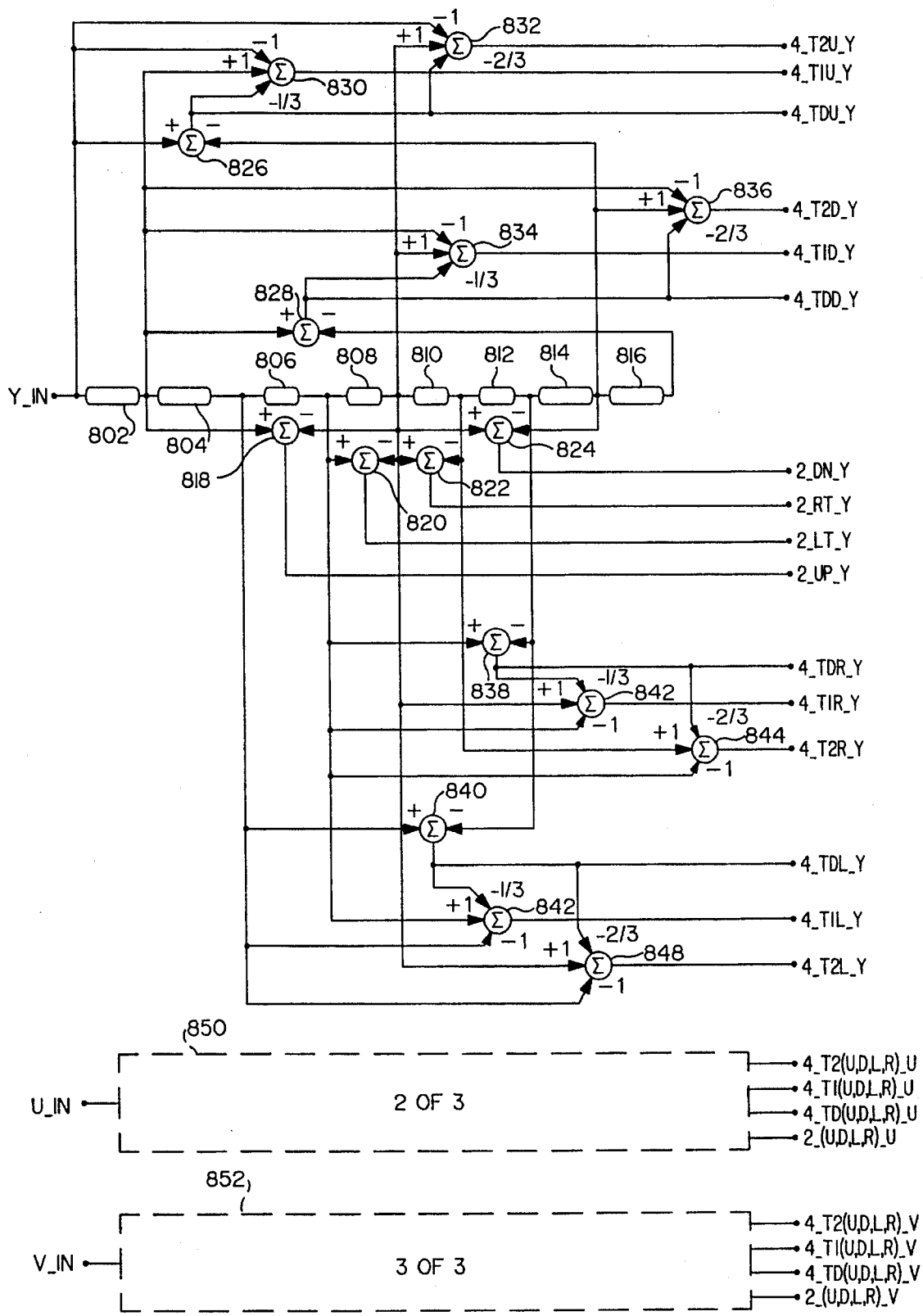
Figure 8B:
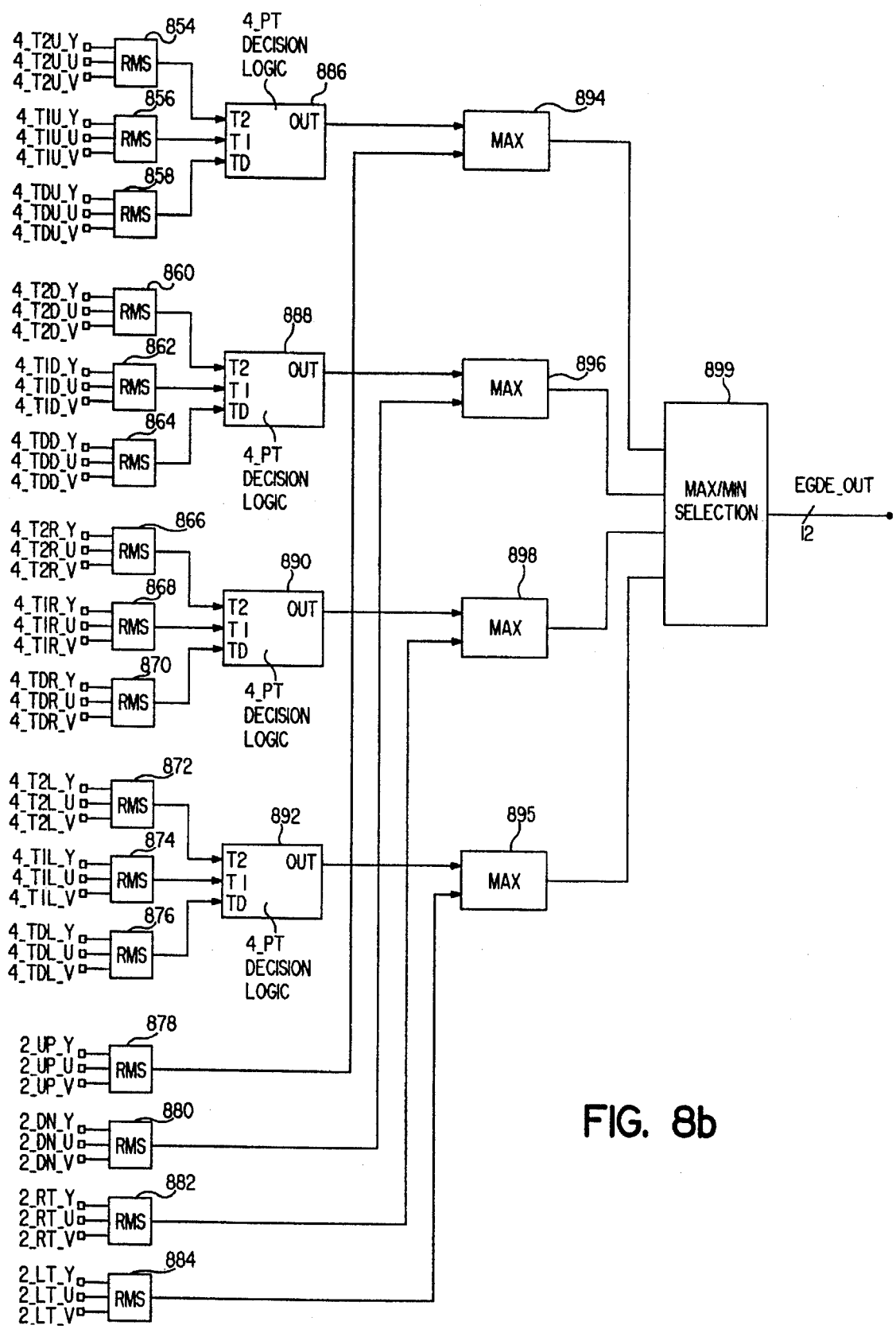

Exemplary circuitry suitable for use as the edge finder is shown in FIGS. 8a and 8b. For simplicity, only the circuitry for the two-pixel window and four-pixel windows is shown. One of ordinary skill in the art of designing image compression circuitry could readily extend the circuitry shown for the four-pixel window to produce circuitry suitable for defining edges within an eight-pixel window.

FIG. 8a includes three identical circuits for developing pixel differences for the luminance samples, Y, and the two color difference samples, U and V. For the sake of simplicity only the circuitry for developing the luminance difference samples is shown in detail.

The central feature of the circuitry shown in FIG. 8a is a delay line which includes delay elements 802 and 816. Each of these elements delays the samples provided at its output port by exactly one line interval from the samples applied to its input port. Delay elements 804 and 814 provide sample delays of one line minus 2 pixels. Delay elements 806, 808, 810 and 812 each provide a 1 pixel delay. In the circuitry shown in FIG. 8a, the pixel which is having its edges determined, identified below as the target pixel value, is the one stored in delay element 808.

Pixel difference values which are used to define the edges in the two-pixel window are developed by the subtracters 818, 820, 822 and 824. Subtracter 818 develops the difference between the pixel value provided by delay element 802 and that provided by delay element 808. Subtracter 824 develops the difference between the pixel value provided by delay element 808 and that provided delay element 814. The value 2_UP_Y provided by the subtracter 818 represents the difference between the target pixel value and a pixel value occurring exactly one line above the target pixel value in the input image. Similarly, the value 2_DN_Y provided by the subtracter 824 represents the difference between the pixel value and a pixel value occurring one line interval below the target pixel value. Subtracters 820 and 822 generate respective values 2_RTY and 2_LTY which represent, respectively, the differences between the pixel value provided by delay element 808 and that provided delay elements 806 and 810. Subtracter 826 produces a signal 4_DTU_Y which represents the edge height of the four-pixel window centered at the upper link of the target pixel value. Similarly, subtracter 828 develops a value 4_TDD_Y representing the four-pixel edge height for the down link of the target pixel.

Summing units 830 and 832 generate values 4_T1U_Y and 4_T2U_Y which represent the $t_1$ and $t_2$ values for the upper link of the target pixel value as defined by equations (4). Summing units 834 and 836, in the same way, develop the $t_1$ value (4_T1D_Y) and $t_2$ (4_T2D_Y) values for the down link of the target pixel value.

It is apparent to one of ordinary skill in the art that the subtracter 838 and summing units 842 and 844 produce the edge height for the right link of the target pixel value (4_TDR_Y), and the $t_1$ and $t_2$ values for the right link (4_T1R_Y and 4_T2R_Y). In the same way the subtracter 840 and the summing units 846 and 848 produce the edge height, and $t_1$ and $t_2$ values for the left link of the target pixel value. These are respectively 4_TDL_Y, 4_T1L_Y and 4_T2L_Y. The circuits 850 and 852 shown in FIG. 8a operate on the respective U and V color different signals to generate the corresponding pixel difference values for the up, down, left and right links of the U and V color difference components of the target pixel value.

The circuitry shown in FIG. 8b processes each parameter of all three parameters in each of the four directions using 16 root-mean-square (RMS) circuits 854 through 884. The RMS values of the three edge parameters, $t_1$, $t_2$ and $t_d$ (edge height), provided for each of the four-pixel window edges are processed by respectively different four-point decision logic circuits, 886 through 892 to determine whether an edge is defined for the target pixel in respective four-pixel windows surrounding the pixel on the left, right, up, and down, directions. If an edge is defined, in accordance with equation (6), the decision logic circuit passes the value applied to its $t_d$ input port as the edge height. If the decision logic circuit determines that no edge is defined, then it provides an output value of zero.

The edge values produced for the four pixel windows, as determined by the decision logic circuits 886 through 892, and the edge values for the respective two pixel windows, as provided by the RMS circuits 878 through 884 are applied to respective comparators 894, 896, 898 and 895. These comparators select the greater of the two edge values applied to their respective input ports and pass these values to the MAX/MIN SELECTION circuit 899. The circuit 899 then selects the minimum of these maximum values to provide to the histogrammer and sorter circuit, described below with reference to FIGS. 7a, 7b, 7c and 9.

HISTOGRAM AND SORTED LIST GENERATOR

Returning to FIG. 7a, the 12-bit data values provided by the edge finder 720 are applied to the histogrammer and sorter circuit 721. The eight most significant bits of this signal, representing the edge strength of the pixel value being processed, are applied to one data input port of a multiplexer 722. The other input port of the multiplexer is coupled to receive the output signal of a counter 728 which is only active in the second stage of the mode 0 processing.

This second stage is indicated by the signal CUMULATE, provided by the circuitry shown in FIG. 7b, being in a logic-one state. During this second stage, the counter 728 successively counts from 0 to 255 at a rate determined by the signal MASTER_CLK to index through the addressed cells of a histogram memory 732. When the counter 728 reaches its maximum count value, it produces a pulse signal CUMULATE_TC.

The output data provided by the multiplexer 722 is applied to one signal input port of a multiplexer 730. The other input port of the multiplexer 730 is coupled to receive the output signal of the counter 728. The multiplexer 730 is controlled by the signal MODE to pass the edge strength signal from the multiplexer 722 when MODE equals zero and to pass the output signal of the counter 728 when MODE is one, two or three. The output data from the multiplexer 730 is applied to the address input port of the histogram memory 732 which has 256 18-bit storage cells.

The output port of the memory 732 is coupled to a one data input port of a multiplexer 737 and to the input port of a one-clock period delay element, 734. The delay element is clocked by the signal MASTER_CLK and is reset by the signal RAST_TC. The signal RAST_TC is generated by the counter 714 to mark the end of a field of the input video signal. The output port of the delay element 734 is coupled to one data input port of a multiplexer 736, the other input port of which is coupled to receive a logic-one signal. The multiplexer 736 is controlled by the signal CUMULATE to pass a logic-one during the first stage of the sorting process and to pass the output data values provided by the delay element 734 during the second stage of the sorting process. The output port of the multiplexer 736 is coupled to the other input port of the summing circuit 738.

The multiplexer 737 is coupled to receive the output value provided by the memory 732 at one data input port and to receive the data value held by a register 735 at its other data input port. The output port of the multiplexer 737 is coupled to the second input port of a summing circuit 738. The multiplexer 737 is controlled by the signal CUMULATE to pass the data values provided by the memory 732 during the first stage of the edge-sorting process, when CUMULATE is logic-zero, and to pass the value held in the register 735 during the second stage of the process, when CUMULATE is logic-one.

The output port of the summing circuit is coupled to the input port of the register 735 and to one data input port of a multiplexer 742. The other input port of the multiplexer 742 is coupled to receive a logic-zero signal. The multiplexer 742 is controlled by the signal MODE to pass the output data provided by the summing circuit 738 when MODE equals 0 and to pass the logic-zero signal when MODE equals 1, 2 or 3. The final connection to the histogram memory 732 is made by the multiplexer 740 which is coupled to pass the master clock signal MASTER_CLK when MODE equals 0 or 1 and to pass a logic-one when MODE equals 2 and to pass a logic-zero when MODE equals 3.

This signal is passed to the write enable (WE) input terminal of the memory 732.

The output data of the histogrammer and sorter 721 are the LIST_WRITE_IN_ADR from the histogram memory 732 and LINK_BITS data as provided by the edge finder 720.

As described above, the link sorting process operates in three stages. These are initialize, cumulate and sort. The circuitry which generates the signals that determine the stages is shown in FIG. 7b. The circuitry includes two D-type flip-flops, 750 and 752 which are initially reset. A logic-one value is applied to the input terminal of the flip-flop 750 and the output terminal of flip-flop 750 is applied to the input terminal of flip-flop 752. Flip-flop 750 is clocked by the signal RAST_TC and the flip-flop 752 is clocked by the signal CUMULATE_TC. The output signal of flip-flop 750 is the signal CUMULATE while the output signal of the flip-flop 752 is the signal SORT. The flip-flop 750 is reset by the inverse of the output signal of the flip-flop 752. The flip-flops 750 and 752 control the operation of the link sorting circuitry as follows. When both of the flip-flops 750 and 752 are reset, the sorting circuitry 721 is in the initialize stage (stage 1), both CUMULATE and SORT are logic-zero. At the end of the initialize stage, the counter 714 generates the signal RAST_TC which sets the flip-flop 750 and causes the signal CUMULATE to become logic-one while the signal SORT remains logic-zero. This begins the cumulate stage (stage 2). At the end of the cumulate stage, the counter 728 generates the pulse signal CUMULATE_TC. This signal sets the flip-flop 752 which, in turn, resets the flip-flop 750. Thus, in the sort stage (stage 3), the signal CUMULATE is logic-zero and the signal SORT is logic-one.

The signal RESET, applied to reset the counter 714 is generated by the circuitry shown in FIG. 7c. In this circuitry, the logical OR of the signal RAST_TC and a signal indicating that MODE equals 1 is generated by an OR gate 760 and applied to a pulse generator 762. The output signal of this pulse generator is applied to the counter 714 to reset it after it has counted through the pixels in the field memory 110 or at the start of mode 1 (i.e. after mode 0 is complete).

SORTED LIST MANAGER

Figure 9:
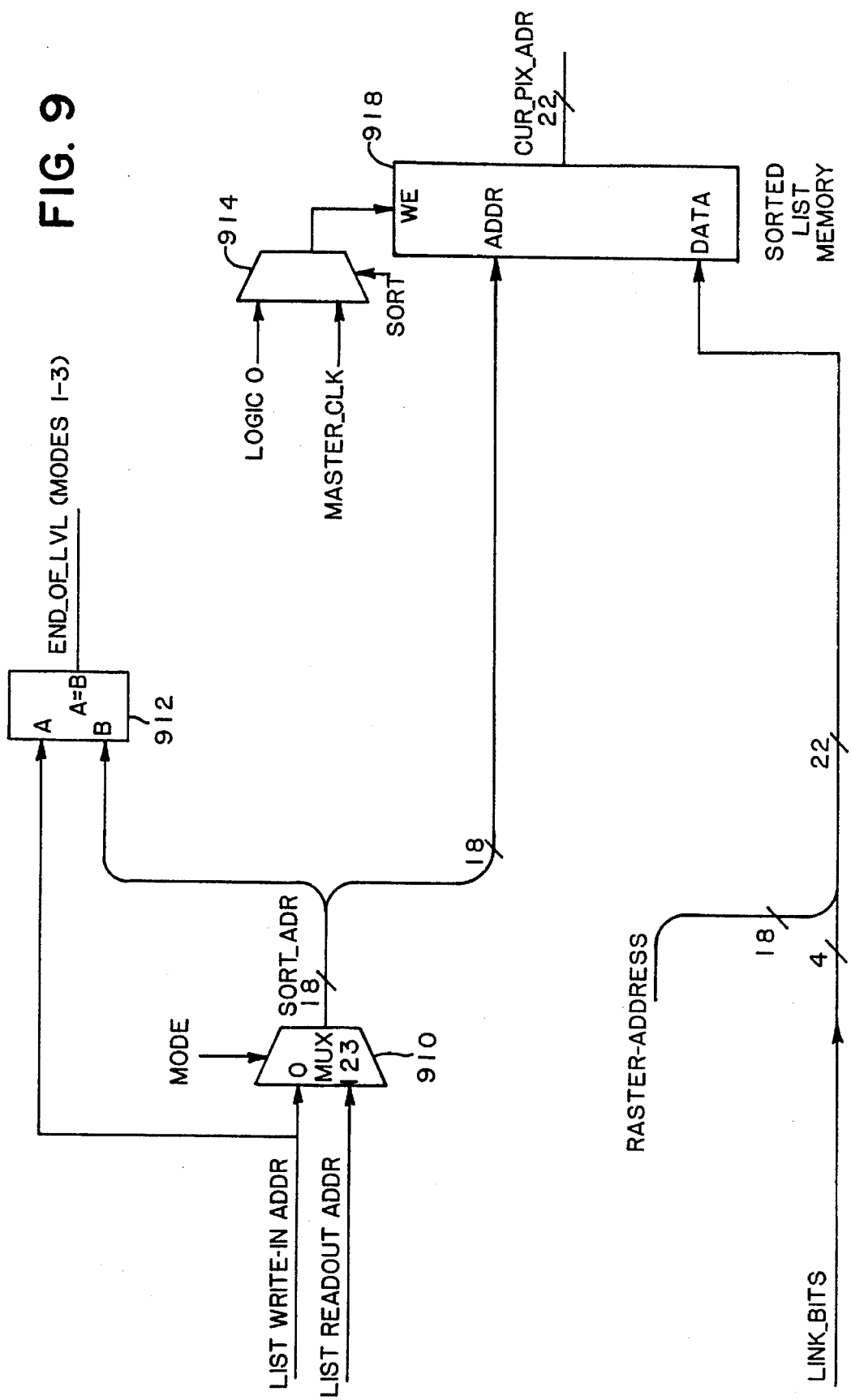

FIG. 9 shows circuitry suitable for use in generating the sorted list of pixel values:. In FIG. 9, the 18-bit RASTER_ADDRESS value provided by the counter 714, shown in FIG. 7a, is concatenated with the four link bits provided by the edge finder 720, also shown in FIG. 7, to produce a 22-bit signal which is applied to the data input port of the sorted list memory 918. Each value of this signal indicates a pixel address and its corresponding link bits. As described below with reference to FIG. 10c, this value is stored at a memory location determined by the edge strength value of the pixel.

The address input port of the sorted list memory 918 is coupled to receive the output signal of a multiplexer 910. This multiplexer is controlled by the signal MODE to pass the LIST_WRITE_IN_ADDR signal, provided by the histogram memory 732 during mode 0 and to pass a signal LIST_READOUT_ADDR, provided by the region growing unit 630, as shown in FIG. 6a, during modes 1, 2 and 3. The write enable signal for the sorted list memory 918 is generated by a multiplexer 914 to be the signal MASTER_CLK when the signal SORT is logic-one and to be a logic-zero otherwise.

The circuitry shown in FIG. 9 also includes a comparator 912 which compares the output signal of the multiplexer 910 to the signal LIST_WRITE_IN_ADDR to generate the signal END_OF_LVL. This signal is only used in modes 1 through 3; it has a logic-one value when LIST_READOUT_ADDR equals zero.

Figure 10A:
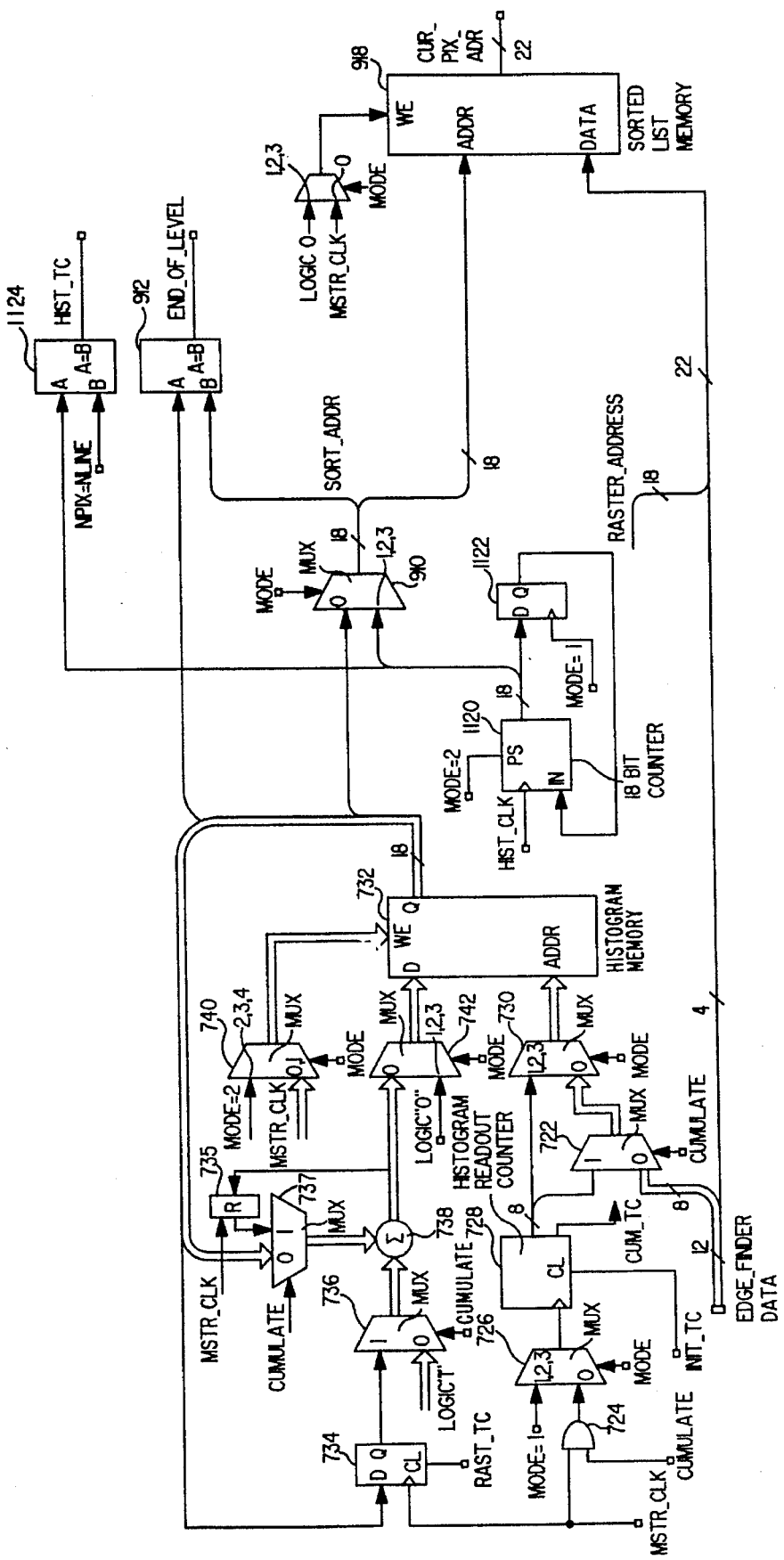
Figure 10B:
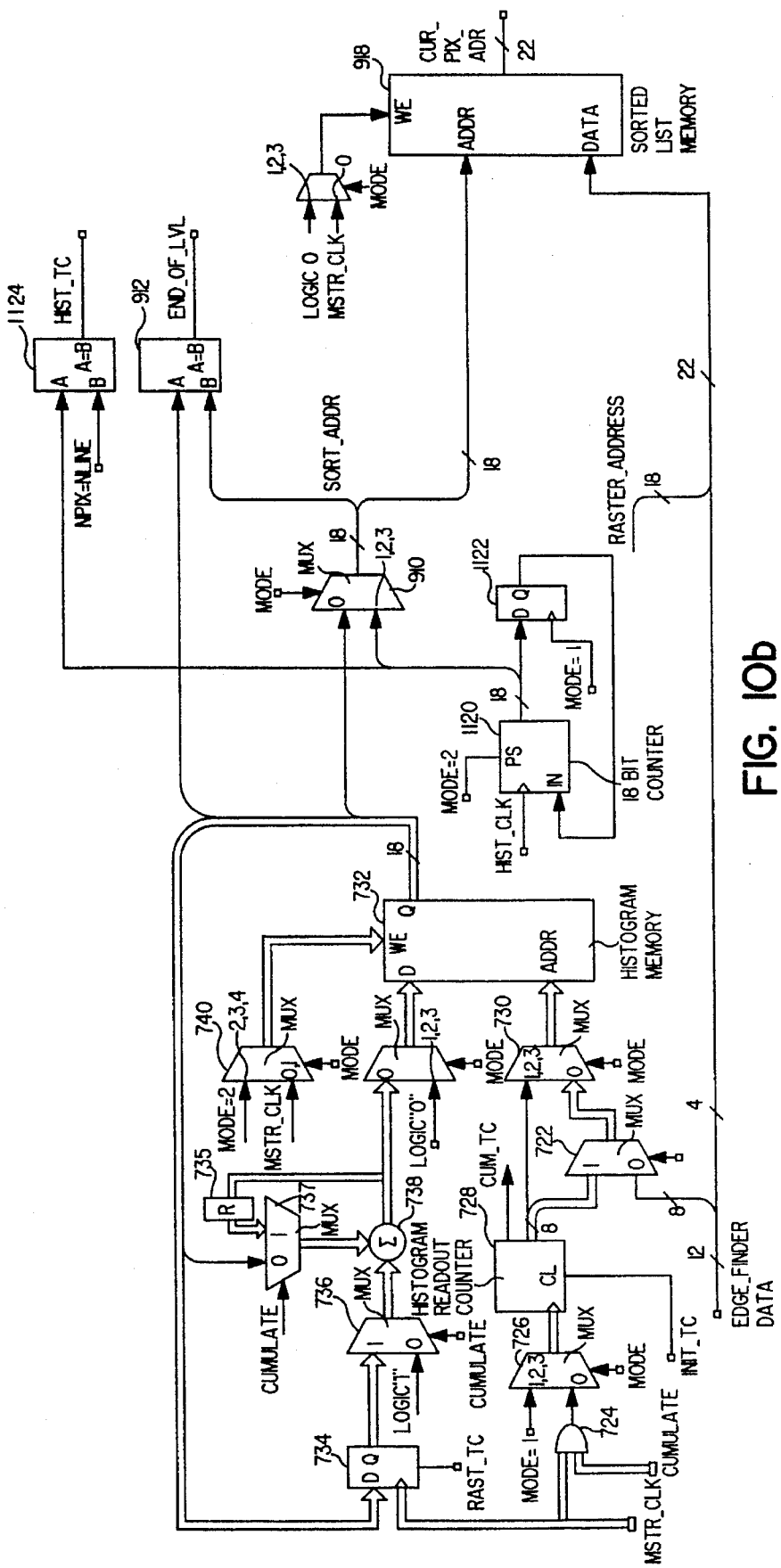
Figure 10C:
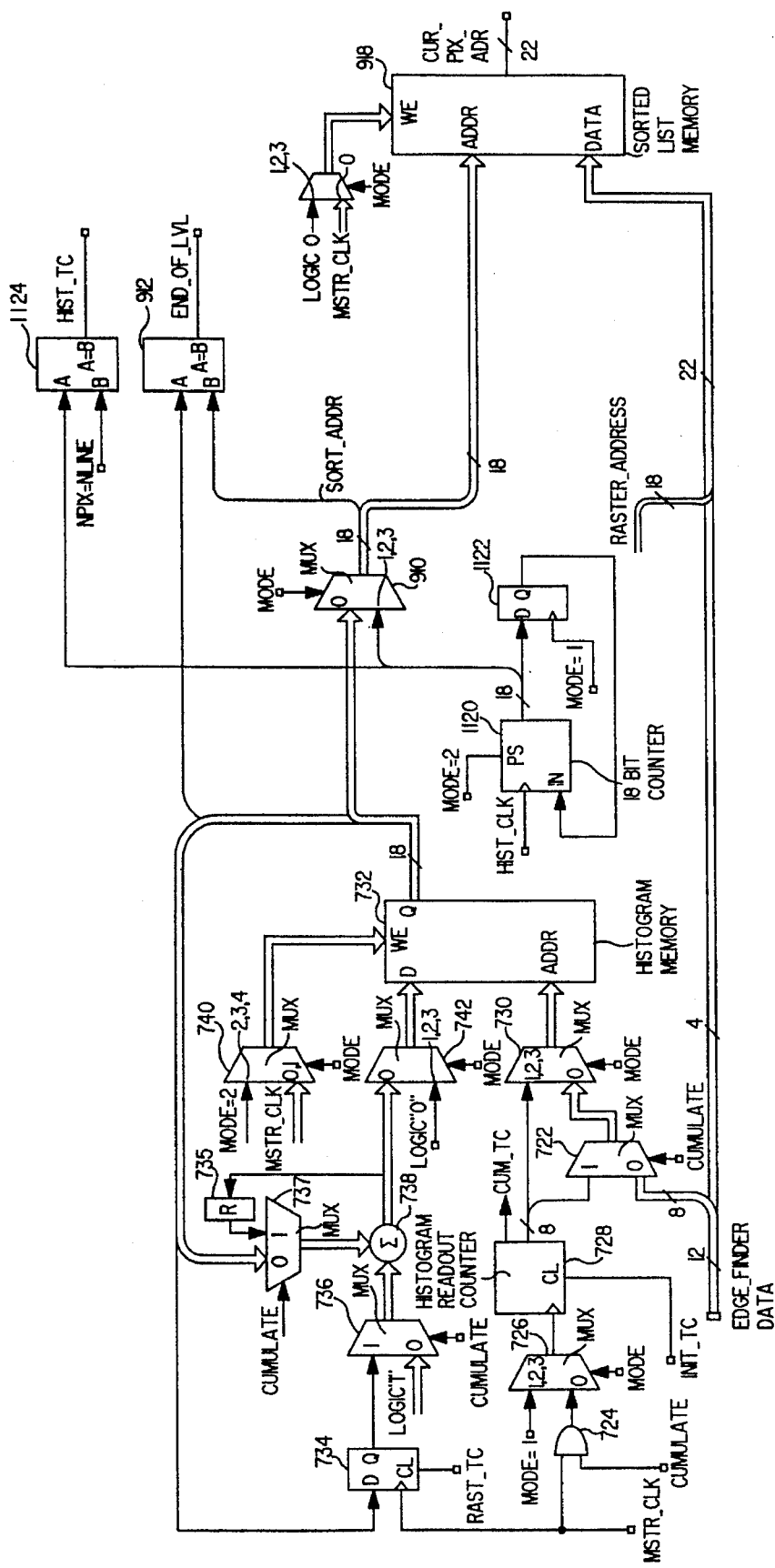

The operation of the circuitry shown in FIGS. 7a, 7b, 7c, 8a, 8b and 9 is described functionally in the initialize, cumulate and sort stages with reference to FIGS. 10a, 10b and 10c, respectively. In these Figures, arrows having thin lines represent inactive data paths while arrows having shaded lines indicate active data paths.

Referring to FIG. 10a, in the initialize mode, the edge strength data provided by the edge finder 110 is applied to the address input port of the histogram memory 732. The data value held in each addressed cell of the memory in this mode is a count value indicating the total number of pixel values at each edge strength level that have been processed so far. As each edge strength total value is addressed, it is incremented by one in the summing circuit 738 and then written back into the addressed memory cell. At the end of the initializing stage, the histogram memory 732 holds a sequence of values, the value in cell zero indicating the number of pixel values in the image having an edge strength of zero, the value in cell 1 indicating the number of pixel values having an edge strength of 1 and so on up to cell 255 indicating the number of pixel values in the image which have an edge strength of 255.

After the initialize mode is complete the pixel sorting circuitry enters the cumulate stage. This is illustrated by FIG. 10b. In this mode, the circuitry shown in FIG. 10b accumulates the counts stored in the successive cells of the histogram memory such that, at the end of the cumulate stage, each cell holds the number of pixels having minimum link values that are less than the link value indicated by the address in the histogram memory.

In the cumulate phase, the control signal CUMULATE has a logic-one value. This signal causes the multiplexer 726 to pass the clock signal MASTER_CLK to the histogram readout counter 728. In response to this signal, the counter generates 256 values from 0 to 255 during successive periods of the signal MASTER_CLK. These values are applied to the address input port of the histogram memory 732 via the multiplexers 722 and 730.

As described above, cell 0 of the memory 732 holds the total number of pixels in the image which have an edge strength of zero. When a 0 is applied to the address port of the memory 732, this total value is stored in the delay element 734 and the output value provided by the adder 738, which in this instance is zero, is stored in cell zero of the memory 732. When a 1 is applied to the address port of the memory 732, the total number of image pixels having an edge strength value of 1 is applied to the delay element 734 and the previous contents of the delay element 734 is applied to one input port of the adder 738. The other input port of the adder 738 receives a zero value from the register 735 via the multiplexer 737. Thus, the output value provided by the adder 738 is the number of pixel values which have an edge-strength of zero. This value is stored into cell 1 of the memory 732 and into the register 735.

When an address value of 2 is applied to the memory 732, the number of pixels having an edge strength of two is stored in the delay element 734 while the sum of the number of pixels having edge strength values of zero and one is stored into cell 2 of the memory 732 and into the register 735. This process continues for each succeeding edge-strength value addressed by the counter 728. When the process is complete, each cell of the histogram memory 732 holds the number of image pixels having edge strength values that are less than the address of the cell. After the $255^{th}$ value has been stored into the histogram memory, the counter 732 generates the signal CUMULATE_TC to end the cumulate stage of the edge sorting process.

After the cumulate phase, the circuitry enters the sort stage, as shown in FIG. 10c. In this stage, the image data is read out of the memory 110, shown in FIG. 7a, and applied to the edge-finder 210. The edge strength values are again applied to the address input port of the memory 732. As each address is applied, its corresponding raster address value, as provided by the raster address counter 714, shown in FIG. 7a, is applied to the data input port of the sorted list memory 918. The sorted list memory 918 is coupled to receive, as its address value, the output data value provided by the histogram memory 732. This address value is generated by the memory 732 in response to the edge-strength value provided by the edge-finder 210. As the raster address value is stored into the memory 918, the value in addressed cell of the memory 732 is incremented using the adder 738 and stored back into the memory 732.

At the end of the sort phase, the sorted list memory holds the raster address of each pixel in the image memory 110 sorted in order of the edge strength of the pixel at that raster address. At the end of the sort stage of mode 0, the pixel SOLE processor 210, as shown in FIG. 6a enters mode 1 and begins the region growing phase of the process.

REGION GROWING UNIT

As described above, at the start of the region growing phase, the sorted list memory 918, shown in FIG. 9, holds the raster address of each pixel in the image sorted in order of its edge-strength value. Region growth proceeds one edge-strength level at a time. First all of the pixel values having edge-strength zero are processed, followed by all having edge strength 1 and so on until all pixels having edge strength 255 have been processed. A three step algorithm is applied at each level. Steps one (mode 1) and two (mode 2) add neighboring pixels to already existing regions. Step three (mode 3) cleans up pixel values which were not attached to an existing region by connecting those pixels to each other and giving the resulting regions new labels; this step seeds new regions.

Figure 11A:
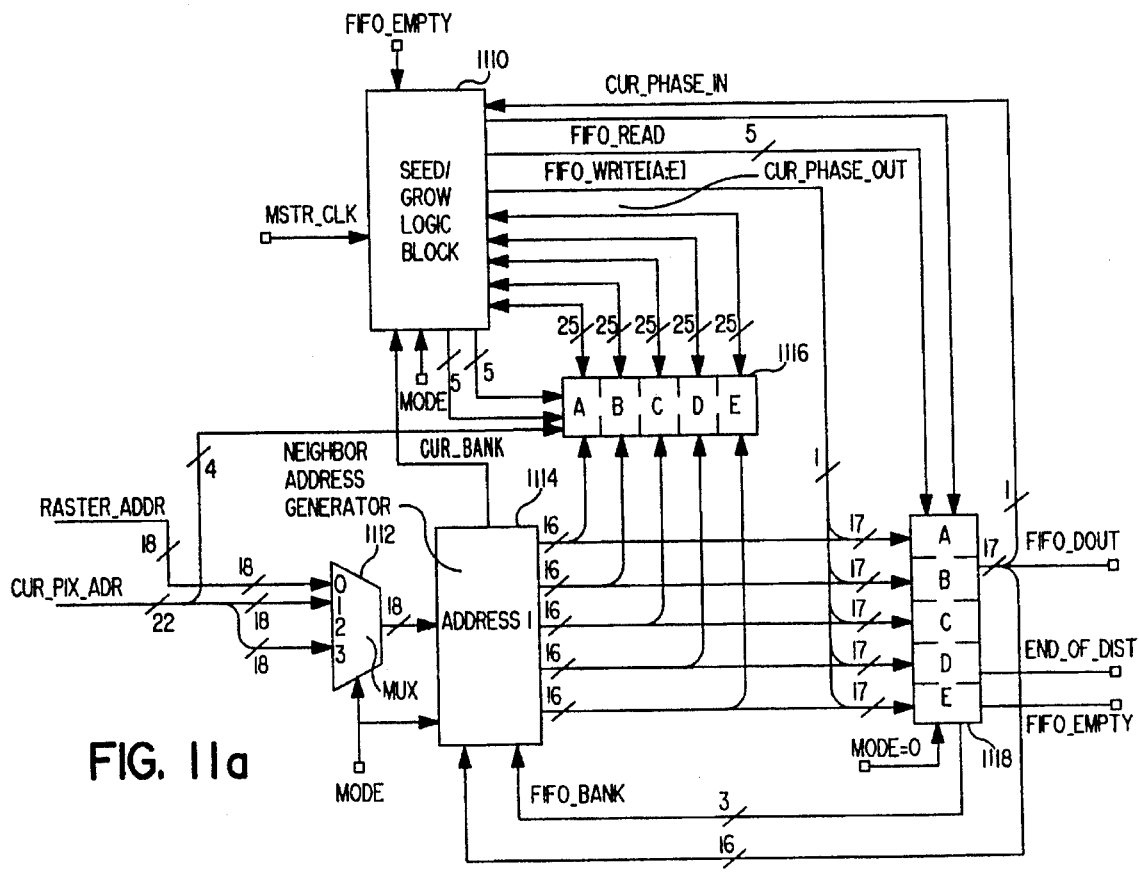
Figure 11B:
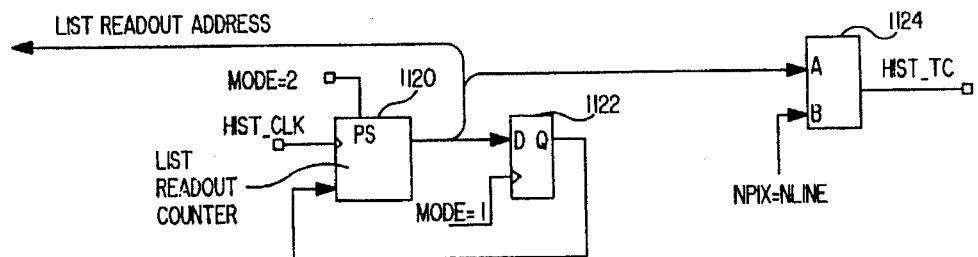
Figure 11C:
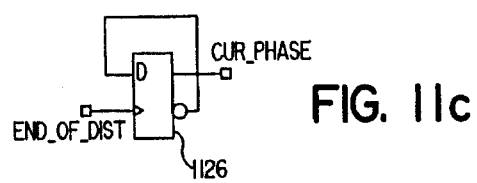
Figure 11D:
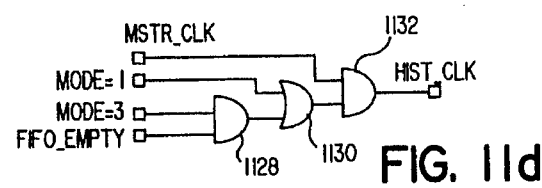

The region growing process is driven from a FIFO memory 1118, shown in FIG. 11a. In mode 1, the FIFO is loaded with the pixel values at the next edgeness level. In order to prime the FIFO, the sorted list memory 918 is read, starting at its lowest address value. The reading of the sorted list memory 918 is controlled by a list readout counter 1120, shown in FIG. 11b. The counter 1120 increments its value responsive to a signal HIST_CLK which is generated by the circuitry shown in FIG. 11d. This circuitry includes two AND gates 1128 and 1132 and an OR gate 1130. HIST_CLK is the same as MASTER_CLK if the system is operating in mode 1 or if the system is operating in mode 3 and the FIFO memory 1118 is empty.

Responsive to the clock signal HIST_CLK the list readout counter 1120 fetches pixel raster addresses and their corresponding link-bits from the sorted list memory 918 until the mode changes from mode 1 to mode 2. This mode switching is described below with reference to FIGS. 12a through 12d. At the start of mode 1, the first address of the sorted list memory 918 that was addressed in mode 1 is stored in a latch 1122. This address is used as a preset for the counter in mode 3. The counter is held in the preset state during the duration of mode 2 by the mode=2 signal applied to its preset input terminal. When the system enters mode 3, this preset is released and the counter 1120 again counts from the value that was stored in the latch 1122. As set forth below, this value is the starting value for a new link level in the histogram memory. When the value provided by the counter 1120 equals the last pixel value (i.e. NPIX times NLINE), as determined by a comparator 1124, the last pixel in the last link level has been processed and the circuitry shown in FIG. 11b generates the signal HIST_TC.

As the raster address values and corresponding link-bits of the current pixel are read from the sorted list memory 918, the address portion is applied to a multiplexer 1112 while the link-bit portion is applied to the seed/grow logic block 1110. In mode 1, the address of the current pixel is applied to a neighbor address generator 1114. This circuit generates address values for a five-bank memory. For each input pixel value, the address generator 1114 produces five address values, one for a memory location corresponding to the current pixel value and four other memory locations corresponding to the four pixel values which share links with the current pixel value. These are applied to respective banks, A through E of the region memory 1116 and to respective banks of the FIFO memory 1118. All of the addressed pixel values of the region memory are concurrently accessed by the seed/grow logic block. In order for this to occur, the data for each of the pixel values must be stored into and fetched from the five-bank memory 1116 in a particular order. This order is determined by the neighbor address generator 1114.

During mode 0, while the edge-strength values are being sorted and stored in the histogram memory, the sorted list memory 1116 is initialized to hold the link bits for each pixel in the image. This is accomplished by the multiplexer 1112, which, in mode zero, passes the RASTER_ADDRESS signal generated by the counter 714, shown in FIG. 7a. In addition, the link bit portion of the signal provided by the edge-finder 720 is applied to the data input port of the sorted list memory 1116. As each pixel address value is produced by the counter 714, its corresponding link-bits are stored into the sorted list memory 1116. The remaining bits in each cell of the memory 1116 are set to zero as the link bits are stored into the cell.

NEIGHBOR ADDRESS GENERATOR

Figure 11E:
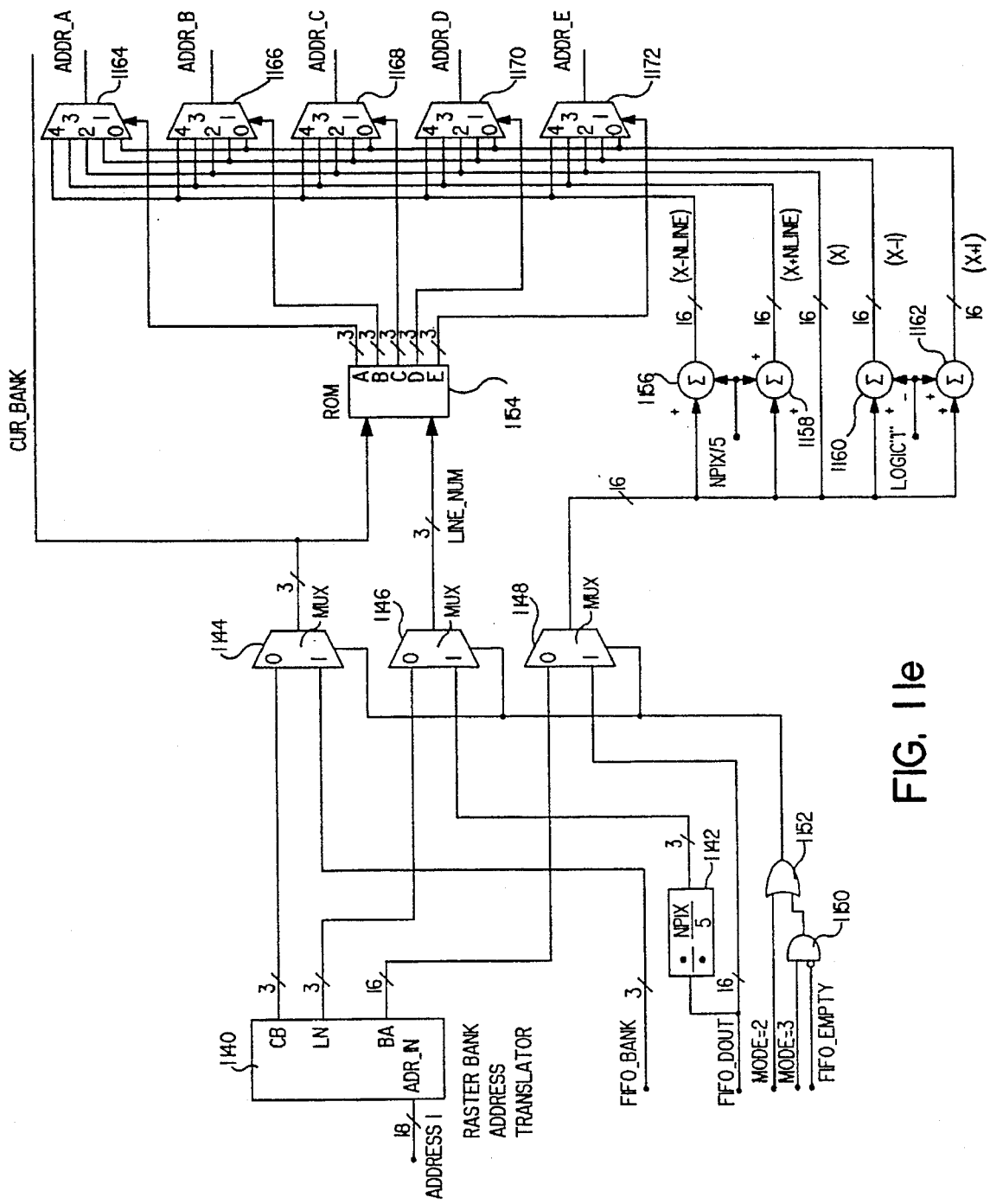

The neighbor address generator is shown in FIG. 11e. In this Figure, the input address value is applied to a raster bank address translator 1140. This circuit selects which of the five memory banks is to be used to fetch the data for the current pixel and which are to be used to fetch the data for each of the four neighboring pixel values. The raster bank address translator is, in turn, shown in detail in FIG. 11f.

Figures 11F, 11G, 11H:
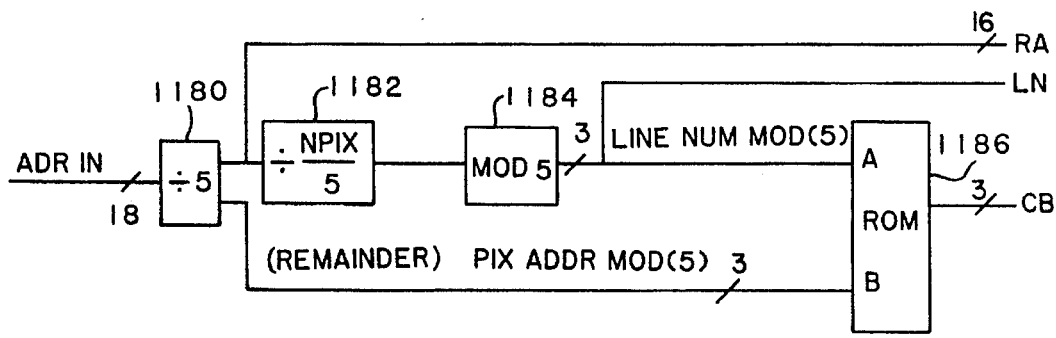
FIG. 11f is block diagram of circuitry suitable for use as the raster bank address translator shown in FIG. 11e.
FIG. 11g is a data structure diagram which shows the contents of the read-only memory shown in FIG. 11e.
FIG. 11h is a diagram of pixel positions in an image frame which illustrates the raster bank assignment performed by the neighbor address generator shown in FIG. 11e.

As shown in FIG. 11f, the input address values are applied to a divide-by-five circuit 1180. The remainder portion of this division operation is applied to an address port B of a read only memory (ROM) 1186. The result of the division operation is applied to a divider 1182 which divides the number by a quantity equal to the number of pixels in a line divided by five (NPIX/5). The result of the division performed by the divider 1180 is also provided as the output signal BA. This signal is the of the current pixel in the current bank of the memory.

The result of the division by NPIX/5, provided by the divider 1182, is the line number of the current pixel. This line number is applied to a modulo-five divider 1184. The output value produced by the modulo-five divider 1184 is the line number of the current pixel, modulo 5. This value is provided as the output value LN of the raster bank address translator 1140, which indicates the current line number in each of the memory banks. The value CB is also applied to the A address port of the ROM 1186. The ROM 1186 is programmed, as shown in FIG. 11g, to produce an output signal CB which indicates which bank is the current bank in response to values of A and B from 0 to 4.

Returning to FIG. 11e, the output signals of the raster bank address translator indicate the current bank (CB), the current line number (LN) and the address of the pixel in the bank (BA). These signals are applied to respective data input ports of three multiplexers 1144, 1146 and 1148. The other input ports of these multiplexers are coupled to receive respective bank address (FIFO_BANK), line address, and in-bank address (FIFO_DOUT) values from the FIFO memory 1118. The FIFO line address is generated by the divider 1142 which divides the signal FIFO_DOUT by NPIX/5.

The output value provided by the multiplexer 1144 is the signal CUR_BANK which indicates in which of the five banks the current pixel is found. The output value provided by the multiplexer 1146 indicates in which line of the current bank the current pixel is found. The output value provided by the multiplexer 1148 is the address within the current bank of the current pixel.

The two 3-bit signals CUR_BANK and LINE_NUM are applied to a ROM 1154 which generates five control signals for five multiplexers 1164 through 1172 that provide the five address values for the five memory banks, respectively.

The 16-bit bank address value provided by the multiplexer 1148 is applied to two subtracters 1156 and 1160 and to two adders 1158 and 1162. These circuits generate five address values, the output value of subtracter 1156 points to the pixel one line above the current pixel, the output value of adder 1158 points to the pixel value one line below the current pixel, the output value of subtracter 1160 points to the pixel before the current pixel and the output value of adder 1162 points to the pixel after the current pixel.

The ROM 1154 is programmed as indicated in Table 1. In this table, the letters A, B, C, D and E in the top row represent the five output signals provided by the ROM 1154 in response to each pair of LINE_NUM and CUR_BANK values.

rounding the current pixel to be simultaneously stored into the region memory 1116. These addresses applied to the FIFO memory 1118 allow selected ones of the pixels that surround the current pixel to be simultaneously added to the FIFO queue.

The region memory 1116 is a five-bank parallel memory, each bank having a separate address input port and data input/output port. This memory is not described in detail.

The FIFO memory 1118 is organized in five banks. Each bank is a separate queue, holding address values which are assigned to the bank by the neighbor address generator 1114. Unlike the region memory 1116, only one data entry is read from the FIFO memory 1118 at any given time, although multiple address values may be simultaneously written into the FIFO memory. The address values to be written into and read from the FIFO memory 1118 are selected by the seed/grow logic block 1110, shown in FIG. 11a and described in detail below with reference to FIG. 12.

Figure 13:
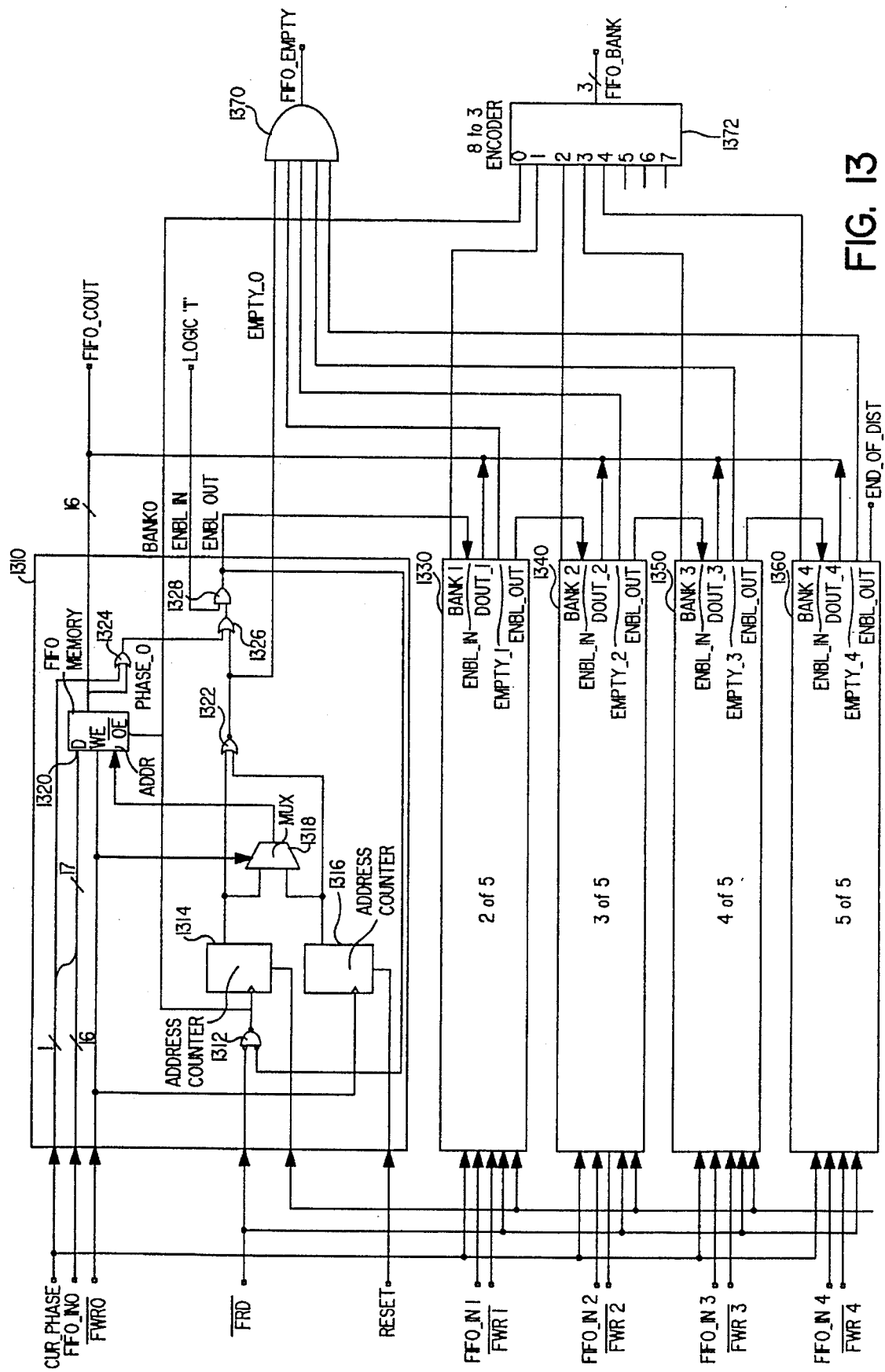

Circuitry suitable for use as the FIFO memory 1118 is shown in FIG. 13. Although the memory includes five banks, only one, bank 0, is shown in detail in FIG. 13. The central element of this memory bank is a random access memory element 1320. This is a single port memory which accepts address data from the neighbor address generator 1114 as the signal FIFO_IN0 at its data input port and accepts an address value provided by a multiplexer 1318 at its address

TABLE 1

| | LINE_NUM | | | | | | | | | | | | | | | | | | | | | | | | |
|---|---|---|---|---|---|---|---|---|---|---|---|---|---|---|---|---|---|---|---|---|---|---|---|---|---|
| | 0 | | | | | 1 | | | | | 2 | | | | | 3 | | | | | 4 | | | | |
| CUR_BANK | A | B | C | D | E | A | B | C | D | E | A | B | C | D | E | A | B | C | D | E | A | B | C | D | E |
| 0 (A) | 2 | 2 | 4 | 3 | 1 | 2 | 2 | 4 | 3 | 2 | 2 | 0 | 4 | 3 | 2 | 2 | 2 | 4 | 3 | 2 | 2 | 2 | 4 | 3 | 2 |
| 1 (B) | 2 | 2 | 2 | 4 | 3 | 2 | 2 | 2 | 4 | 3 | 1 | 2 | 2 | 4 | 3 | 2 | 2 | 2 | 4 | 3 | 2 | 2 | 0 | 4 | 3 |
| 2 (C) | 3 | 2 | 2 | 2 | 4 | 3 | 2 | 2 | 0 | 4 | 3 | 2 | 2 | 2 | 4 | 3 | 2 | 2 | 2 | 4 | 3 | 1 | 2 | 2 | 4 |
| 3 (D) | 4 | 3 | 2 | 2 | 2 | 4 | 3 | 1 | 2 | 2 | 4 | 3 | 2 | 2 | 2 | 4 | 3 | 2 | 2 | 2 | 4 | 3 | 2 | 2 | 2 |
| 4 (E) | 0 | 4 | 3 | 2 | 2 | 2 | 4 | 3 | 2 | 2 | 2 | 4 | 3 | 2 | 2 | 2 | 4 | 3 | 2 | 2 | 2 | 4 | 3 | 2 | 2 |

The neighbor address circuitry shown in FIGS. 11e and 11f produces a pixel mapping such as that shown in FIG. 11h. This Figure shows the pixels in raster address form, with an indication of the memory bank in which each pixel is placed. Each line of the Figure represents a line of the raster scanned image. The first and last lines representing the respective first and last lines of the image. As can be seen from this image, when any pixel in the raster image is in one memory bank, its four surrounding pixels are located, one in each of the other banks. This memory arrangement allows a data for a pixel and each of its four neighboring pixels to be accessed simultaneously.

It is contemplated that the scheme outlined above may be extended to allow the eight pixels which surround a given pixel (i.e. top, top-right, right, bottom-right, bottom, bottom-left, left and top-left) to be accessed simultaneously with the access of the center pixel. In addition, pixels from a previous frame and a succeeding frame could also be stored in a memory such that a total of 16 pixels (four from each of the preceding and succeeding frames and eight from the current frame) could be simultaneously accessed. Other addressing schemes may allow a larger number of pixels, defining, for example, the kernel of a spatial filter, to be simultaneously accessed based on a modulo addressing scheme similar to that described above.

Returning to FIG. 11a, the address values provided by the neighbor address generator 1114, applied to the region memory 1116, allow label and status data for pixels surinput port. This address value is provided either by a read address counter 1314 or a write address counter 1316.

In the exemplary embodiment of the invention, there is no conflict between reading and writing the FIFO memory, since the memory is accessed at distinct times for reading and writing by the seed/grow logic block. Accordingly, the inverted write enable signal, FWRO' is used to control the multiplexer 1318 to select between the address values provided by the counters 1314 and 1316. When the read address value equals the write address value, as indicated by the exclusive NOR gate 1322, the FIFO bank is empty. When this condition is detected, the FIFO bank 0, 1310, provides a signal EMPTY_0 to an AND gate 1370. If all of the FIFO banks are empty then this AND gate produces the signal FIFO_EMPTY which indicates to the seed/grow logic block that there are no more entries in the FIFO.

As described below, before all of the data values have been read from the FIFO memory 1118, new data values may be written into the memory. These sets of data values, however, are processed in different phases of the algorithm. The value of the pixel phase is supplied by the seed/grow logic block 1110, shown in FIGS. 12a through 12d, and is stored with the pixel address value in the FIFO memory 1118. In addition, the seed/grow logic block 1110 provides a signal CURRENT_PHASE which indicates the current phase of the algorithm. This value is combined with the phase value of the current pixel in an EXCLUSIVE-OR gate 1324. If the phases are equal then the gate 1324 provides a logic-zero signal to an OR gate 1326. If the phase values are different, a logic-one value is provided to the OR gate. The other input to this OR gate is the signal EMPTY_0. The output signal of the OR gate 1326 is combined with a logic-one signal applied to the ENBL IN terminal of the FIFO bank by an AND gate 1328. The output signal of the AND gate 1328 is provided as an output signal ENBL OUT. This signal is applied to the ENBL in terminal of the next FIFO bank, 1330. The ENBL IN and ENBL OUT terminals of the five FIFO banks 1310, 1330, 1340, 1350 and 1360 are coupled in series such that the ENBL OUT signal of the fifth FIFO bank, 1360, is a signal END_OF_DIST which indicates when each FIFO bank is either empty or providing address values for the next phase of the algorithm. This signal is used, as described below with reference to FIG. 12.

Address values are written into the FIFO memory banks responsive to the signals FWR0', FWR1', FWR2', FWR3' and FWR4' provided by the seed/grow logic 1110. The next address value is read from the FIFO memory 1118 responsive to the signal FRD'. The memory is arranged such that all addresses at the current phase which are stored in FIFO bank 0 are read first, followed in succession by all addresses at the current phase which are stored in FIFO banks 1, 2, 3 and 4. The bank which is providing the address value is indicated by the signal FIFO_BANK provided by the 8 to 3 decoder 1372. The address value provided by the FIFO 1118 to the seed/grow logic 1110 is in the same format as the address values provided by the neighbor address generator 1114, that is to say, a bank number and an address within the bank.

SEED/GROW LOGIC

The seed/grow logic 1110 is implemented as a state machine. As is well known, a state machine may be implemented either using dedicated hardware or software controlling a general purpose processor. For efficient operation, the state machine used in the subject invention is implemented in hardware. For ease of understanding, however, the operation of the state machine which is used for the seed/grow logic block 1110 is explained using a sequence of flow-chart diagrams shown in FIGS. 12a through 12d.

The seed/grow logic block controls the operation of the region growing unit shown in FIGS. 11a, 11b, 11c and 11d. To simplify the description of the seed/grow logic block and, thus, of the region growing unit, the process illustrated in FIGS. 12a through 12d is described in terms of an exemplary image, the pixels of which have been sorted and stored in the sorted list memory 918, shown in FIG. 9.

The first steps performed by the seed/grow logic occur in mode 0, when the sorted list is being generated by the sorting unit 610 and sorted list manager 620, shown in FIG. 6a. Operation of the seed/grow logic block in mode zero begins at step 1212 when the link bits for each image pixel are stored in the region memory 1116. At the same time, the remaining fields of each cell of the region memory are set to zero. At step 1214, a variable CUR_LABEL which holds the current label value is set to zero. Step 1216 is the end of the mode 0 processing.

Figure 12A:
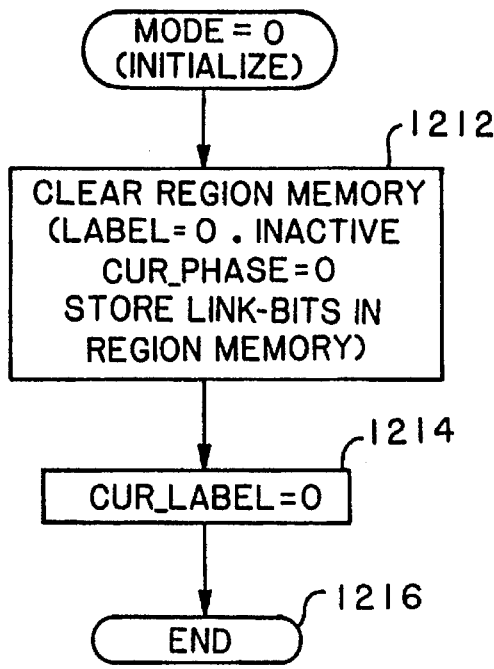
Figure 12B:
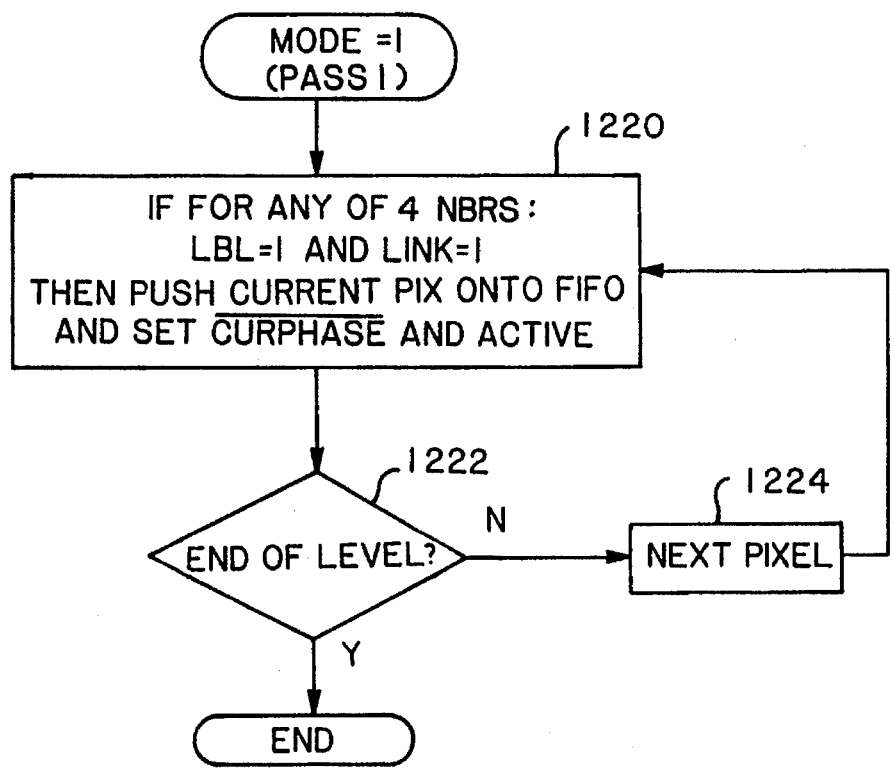
Figure 12C:
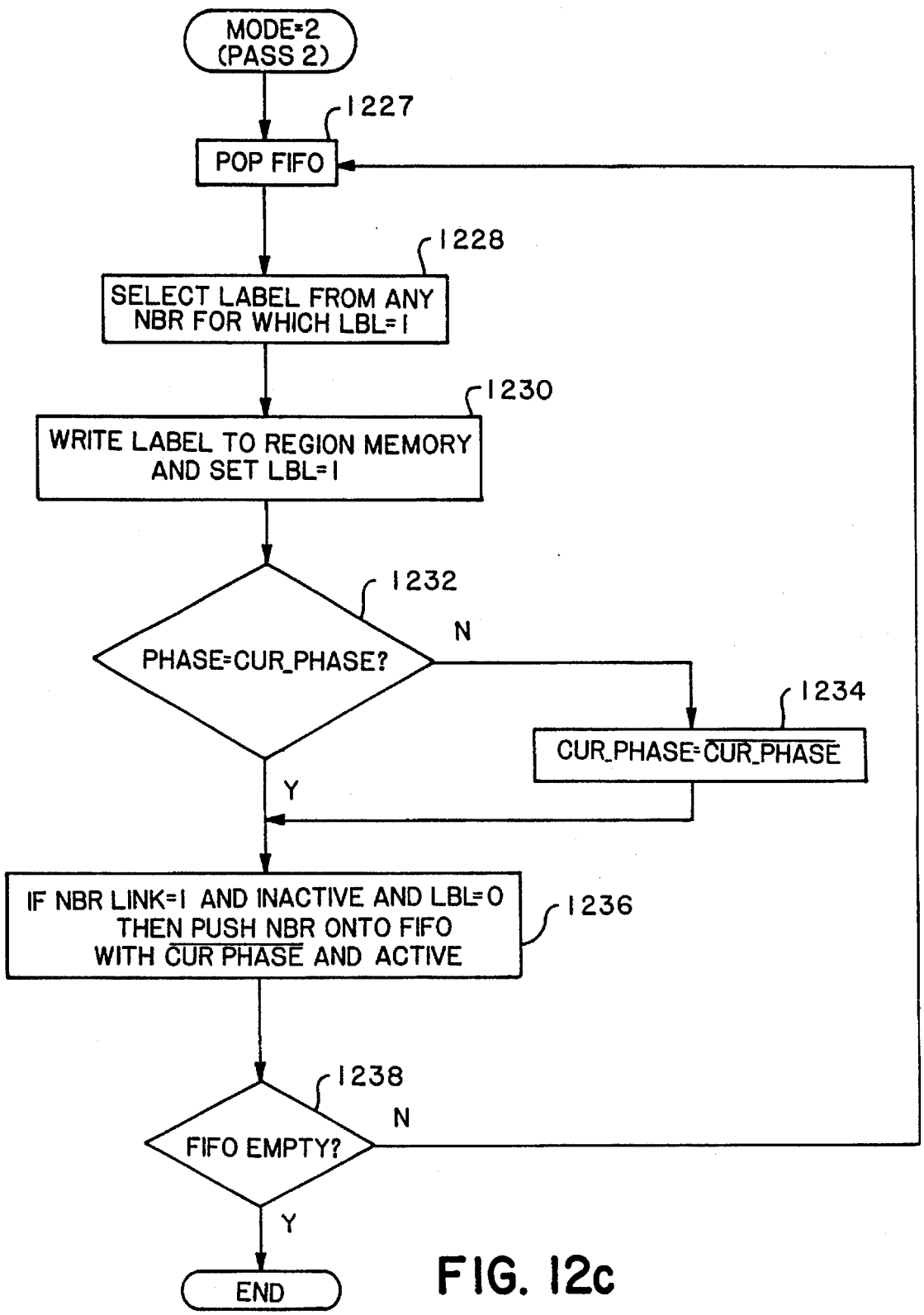

After mode 0, the process executed by the seed/grow unit switches to mode 1, as shown in FIG. 12b. Because this is the first pass, none of the pixel values have been labeled. In step 1220 of FIG. 12b, the first pixel value is read from the sorted list memory and the link-bits for the pixel value in the region memory 1116 are checked for each of its four neighboring pixels to determine if any are labeled. Since none of the pixels are labeled, control passes to step 1222. This step accesses the next pixel in the list as long as it has the same edge-strength value as the present pixel. Since this is the first time that mode 1 is being executed, these pixels are the interior pixels which have an edge-strength value of zero and all four of their link-bits set. When the last zero edge-strength value has been processed, mode 1 ends. Mode 2 then begins at step 1227 of FIG. 12c. This step attempts to pop an entry off of the FIFO memory 1118, shown in FIG. 11a. Since, however, this is the first time through the circuitry shown in FIG. 11a, there are no entries in the FIFO. Accordingly, a null entry is provided. This entry causes control to transfer to step 1238 which ends mode 2. After mode 2, processing for mode 3 begins at step 1244.

Figure 12D:
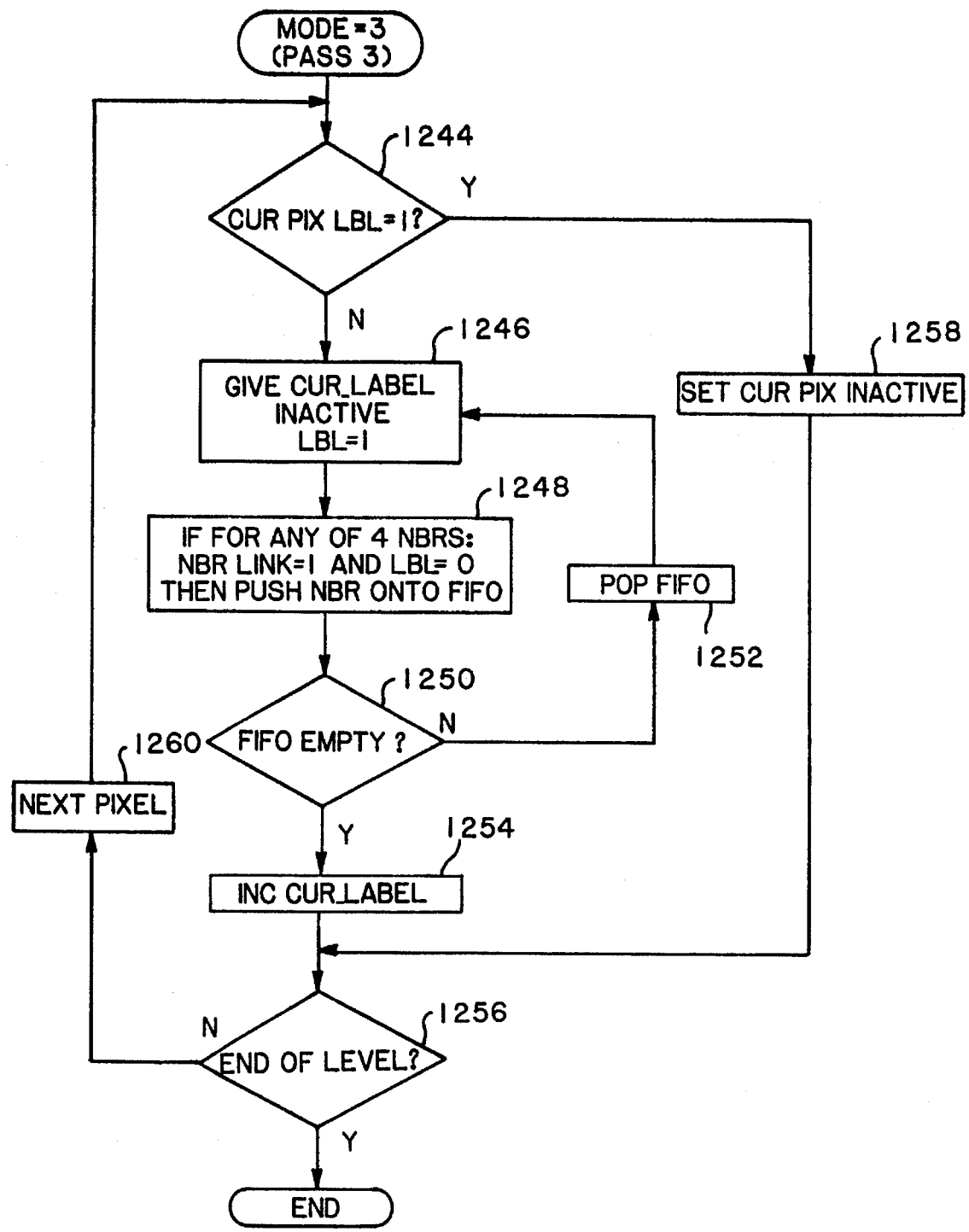

The first step in mode 3 is to determine, at step 1244 of FIG. 12d, if a label has been assigned to the current pixel. In this instance, it has not and control is transferred to step 1246. This step assigns the value held in CUR_LABEL to the current pixel, sets the status of the pixel to INACTIVE and sets a flag, LBL to indicate that the pixel is labeled. Next, at step 1248, each neighbor of the current pixel, as determined by its link bits, is checked to determine if the neighbor is labeled. If it is not the address of the neighboring pixel, as provided by the neighbor address generator 1114 is written into the FIFO memory 1118. In actuality, step 1248 checks the label status of all of the neighbors having links to the selected pixel simultaneously and simultaneously writes addresses for all unlabeled neighbors into the FIFO memory 1118.

After step 1248, control is transferred to step 1250 which, determines whether the FIFO memory 1118 is empty. If, as in this instance, it is not, step 1252 removes the first stored entry from the FIFO 1118, and processes it through steps 1246 and 1248 to propagate the label assigned to the current pixel to all pixels that have links to the pixels which are linked to the current pixel. In addition, these steps place the unlabeled neighbors of the pixels popped from the FIFO memory 1118 into the FIFO memory. This process continues until all pixel values which have links, either directly or indirectly to the current pixel, as indicated by their set link-bits have been assigned the same label as the current pixel.

When, at step 1250, the FIFO memory 1118 is found to be empty, control is transferred to step 1254 in which the value CUR_LABEL is incremented. At step 1256, the seed/grow logic block 1110 obtains the next pixel and determines if it has the same edge-strength value as the current pixel. If it does, then the entry in the region memory 1116 for that pixel is addressed, at step 1260, and control is transferred to step 1244 to label all of the pixels that are linked either directly or indirectly to the addressed pixel with the new value of CUR_LABEL. If, at step 1258, the seed/grow logic block 1110 encounters a pixel that has already been labeled, the pixel is set to INACTIVE and control is transferred to step 1256. At step 1256, when the last pixel at the current level has been processed, Mode 3 ends and control returns to mode 1. After processing the last pixel in a given edge-strength level through the Mode 3 processing, illustrated in FIG. 12d, the first pixel in the next level is accessed and processing returns to mode 1.

The addressing of the sorted list memory to access pixels in a given level both in modes 1 and 3 and then move to the next level for mode 1 is handled by the list readout counter 1120 and register 1122, as described above. At the start of mode 1, the output value of the counter is stored into the register 1122. The counter then counts through the pixels at the current edge-strength level through the remainder of level 1. During the entire duration of Mode 2, the contents of the register 1122 are applied to the preset input port of the counter 1120. As soon as mode 2 ends and mode 3 begins, the counter 1120 first provides the value held in the register 1122 and then increments. At the end of mode 3, the value of the counter is the first pixel of the next edge-strength level. When mode 3 switches to mode 1, this value is stored into the register 1122 and the process is repeated for this new edge-strength level.

At step 1220, if the current pixel has any neighbors which are linked by a set link bit and which have a label assigned in the region memory, then the address of the current pixel is pushed onto the FIFO memory 1118 while the phase value of the current pixel in the region memory is set to the inverse of the CURPHASE value and the status of the current pixel value in the region memory is set to ACTIVE. This process is repeated for each pixel value at the new current edge-strength level via the steps 1222 and 1224, described above. When the last pixel in the new edge-strength level has been processed, mode 1 ends at step 1222 and control is transferred to mode 2.

In mode 2, the FIFO 1118 is not empty so, at step 1227, the top entry is read from the FIFO memory 1118. In step 1128, a label for the pixel which has been retrieved from the FIFO 1118 is selected from one of the neighboring pixel values which has both a label and a set link-bit with the current pixel. This label is assigned arbitrarily as the first label encountered in a predetermined search scheme. Using a set search scheme ensures that the pixel will be assigned to the same region (label) each time that it is processed in a multi-generational compression operation.

The label is then written into the region memory 1116 at the address of the pixel read from the FIFO 1118 and the flag LBL is set for the pixel in the region memory.

Next, at step 1232, the mode 2 process checks the phase value for the pixel that has just been read from the FIFO 1118. If this phase is the not the same as the current phase then the current phase is inverted at step 1234 and control is transferred to step 1236. If the phases match, at step 1232, then control is transferred to step 1236. At step 1236 the link-bits of the pixel retrieved from the FIFO memory 1118 are checked to determined if any of the linked neighboring pixels are inactive (i.e. not already in the FIFO memory) and unlabeled and, as such, should be assigned to the same area. If so, the address of the neighbor is pushed into the FIFO memory 1118 with its phase set to the inverse of CURPHASE and its status set to active.

The value of CURPHASE is changed at each level of pixel values processed through the FIFO memory 1118. As described above, the FIFO memory will supply all of the entries having a CURPHASE value which matches the current phase before providing entries having the inverted CURPHASE value. Thus, the value CURPHASE ensures that the pixel values stored into the FIFO memory 1118 are processed in proper sequence.

After step 1236, the seed/grow logic block 1110 determines if the FIFO memory 1118 is empty. If it is not, control returns to step 1226 and the process repeats until labels have been assigned to all entries in the FIFO 1118. When the FIFO memory is found to be empty at step 1226, mode 2 processing ends at step 1240.

If the current pixel value has not been assigned a label by the mode 1 or mode 2 processing steps, the processing steps for mode 3 is substantially the same as described above. When the current pixel has been assigned a label, its status is set to INACTIVE in the region memory 1116 and mode 3 processing ends. After mode 3, control returns to mode 1.

The process described above repeats until each pixel in the sorted list memory has been processed as the current pixel. At the end of this processing, each pixel in the image has been assigned a label and all pixels have been joined with at least one other pixel by virtue of having been assigned a common label.

The first pass through modes 1, 2 and 3 links all interior pixels to their linked neighbors. Since there are no labels in the region memory in steps 1 and 2, this process occurs in step 3. In the remaining passes, pixels at the higher edge-strength levels are processed. If the given pixel is linked to a pixel that has already been labeled, the same label is assigned to the given pixel in mode 2 and this label is propagated to all of the linked neighbors of the given pixel. Otherwise, the given pixel is assigned a new label in mode 3 and this new label is propagated to all of the linked neighbors of the given pixel.

GRAPH SOLE PROCESSOR

Returning to FIG. 2, after the last pixel in the sorted list memory has been processed through mode 3 of the pixel SOLE processor 212, the labeled image is passed to the graph SOLE processor 214. This processor operates to combine labeled regions, as defined by the pixel SOLE processor 212, in much the same way that the processor 212 combined unlabeled pixels.

While it is contemplated that the graph sole processor may be implemented as a special-purpose state machine, or as a program running on an array of specialized image processing computers, in the exemplary embodiment of the invention, it is implemented as a program running on a general purpose computer.

An exemplary computer system suitable for use as the graph sole processor 214 is shown in FIG. 14. This computer includes a general purpose processor 1430 and a memory 1420. The memory holds the program, described below with reference to FIGS. 15 through 27, and any data structures which are needed by the program. In addition, the computer system reads the pixel-segmented image from the region memory 1116 and the original image from the image memory 110 via an input/output (I/O) processor 1410. The I/O processor 1410 is also used to provide the final segmented image, in raster format, to the lossless coder 114 and to the subtracter 116, as shown in FIG. 1.

Figure 15:
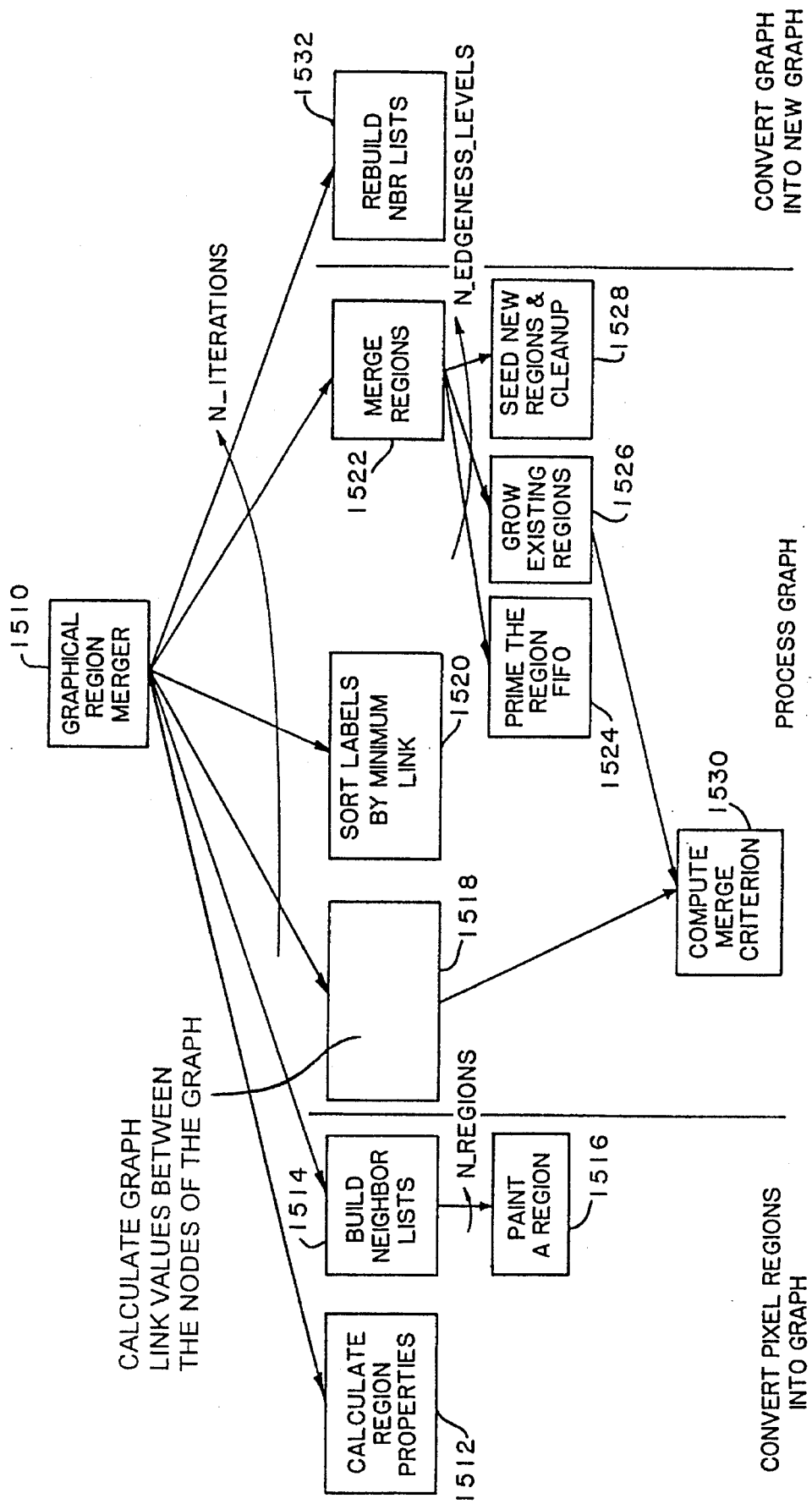
FIG. 15 is a logic flow diagram which illustrates the operation of the graph based segmenter shown in FIG. 2.

The operation of the graphical SOLE processor 214 is described with reference to the data-flow diagram of FIG. 15 and the pseudo-code listings of FIGS. 16 through 27. In FIG. 15, the labeled blocks each corresponds to a respective Figure describing the operation of the block in pseudo-code.

As shown in FIG. 15, the graphical SOLE process is divided into three sub-processes. The first sub-process, CONVERT PIXEL REGIONS INTO GRAPHS, converts the pixel region representation, as contained in the region memory 1116, into a connected graph. This sub-process includes the process blocks CALCULATE REGION PROPERTIES, 1512; BUILD NEIGHBOR LISTS, 1514 and PAINT A REGION, 1516. The second sub-process, PROCESS GRAPH, operates in three steps. First, it determines link values between the nodes of the graph in a process block CALCULATE GRAPH LINK VALUES, 1518. In the next step, the graph nodes are sorted by their minimum link values in the process block SORT LABELS BY MINIMUM LINK. The third step merges the regions defined by the graph nodes using the process blocks MERGE REGIONS, 1522; PRIME THE REGION FIFO, 1524; GROW EXIST- ING REGIONS, 1526; AND SEED NEW REGIONS & CLEANUP, 1528. This second sub-process also includes a process block COMPUTE MERGE CRITERION, 1530 which is executed after the process blocks CALCULATE GRAPH LINK VALUES, 1518, and GROW EXISTING REGIONS, 1526.

The third sub-process, CONVERT GRAPH INTO NEW GRAPH, processes the graph produced by the PROCESS GRAPH sub-process to generate a new graph to be processed by the PROCESS GRAPH sub-process. The steps in the PROCESS GRAPH sub-process and CONVERT GRAPH INTO NEW GRAPH are repeated three times to consolidate the segments in the image.

Finally, the graphical representation of the image produced by the graphical SOLE processor 214 is reconverted into a raster image, by the circuitry 218, shown in FIG. 2 and applied to the lossless coder 114 and subtracter 116, as shown in FIG. 1.

The GRAPHICAL REGION MERGER process block is shown in FIG. 16. At line 1, the process block CALCULATE REGION PROPERTIES is invoked. This process block is described in FIG. 17. As shown in FIG. 17, the CALCULATE REGION PROPERTIES process block scans the image in raster scan order and accumulates, for each region, the area of the region, a sum of the Y, U and V pixel values for the region, a sum of the squares of the Y, U and V pixel values and a determination of the minimum and maximum values for the vector of Y, U and V pixel values over the entire area. During the initial pass, the regions are determined from the labels in the region memory 1116 while the pixel values are determined from the image memory 110.

Returning to FIG. 16, the next step in the GRAPHICAL REGION MERGER process block is to invoke BUILD NEIGHBOR LISTS. This process block is described with reference to FIG. 18. The first step, shown at lines 1 and 2 sets all number of neighbors values (num_nbrs) and all entries in the look-up-table buffer (lutbuf) to zero. The next step in the process, shown at lines 5 through 14, steps through the image in raster-scan order, and negates each pixel value to indicate that the pixel has been "painted." Next, a unique region number is assigned if the pixel does not already belong to an assigned region. In the next step, at line 10, the process block PAINT A REGION is invoked. This process block is shown in FIG. 19. It includes two functions, the read function and the mark function. The read function processes the pixel value, noting regions which border each pixel and adding their region numbers to an offset list. This process also accumulates a number of regions in the num_nbrs entry for the region. As the neighbors are encountered, they are marked in the look-up-table buffer, lutbuf. This marking process is a simple negation and ensures that a neighboring region is not counted twice. A suitable algorithm for implementing this process is described in a paper by Fishkin et al. entitled "An Analysis and Algorithm for Filling Propagation" *Proc. Graphics Interface* 1985, pp 203–212 which is hereby incorporated by reference for its teachings on graphical image processing.

Returning to FIG. 18, at lines 11 and 12, the process block BUILD NEIGHBOR LISTS updates the offset list and num_nbrs data for the region and clears the marks that were made in the lutbuf structure as the neighboring regions were located. A third step in the BUILD NEIGHBOR LISTS process block, shown at lines 16 through 19, changes the signs of all painted pixels back to positive.

Returning to FIG. 16, the GRAPHICAL REGION MERGER enters a loop which processes the graphical representation of the image through n iterations. In the exemplary embodiment of the invention, n is three. The first step in this loop is to invoke the process block CALCULATE GRAPH LINK VALUES. This process block is shown in FIG. 20. This process steps through each identified region and, for each neighbor (as identified in the offset list), invokes the process block COMPUTE MERGE CRITERION to return a link value between the region being processed and the identified neighboring region.

The process block COMPUTE MERGE CRITERION is shown in FIG. 26. This block calculates the criterion as the sum of the differences in the $Y^2$, $U^2$ and $V^2$ values for the two regions, multiplied by the ratio of the product of the areas of the regions divided by the sum of the areas of the regions. The process block returns the square root of this value, limited to a maximum value.

Returning to FIG. 20, the value returned by COMPUTE MERGE CRITERION is stored as the edge-strength value for the link of the region. When all links of all regions have been processed, the process block CALCULATE GRAPH LINK VALUES returns control to the GRAPHICAL REGION MERGER, shown in FIG. 16. The next step in FIG. 16 is to invoke the process block SORT LABELS BY MINIMUM LINK. This process is shown in FIG. 21. It operates in much the same way as the link sorting process of the pixel based SOLE processor. First, it processes each link of each region to locate the minimum edge-strength value for the region. Next, it builds a histogram of regions in the graph in terms of their minimum edge-strength. Finally, it accumulates the values in the histogram cells and then processes the region list to place the regions into a sorted list based on address values obtained from the accumulated histogram data. The end result is a list of the image regions, sorted by their minimum edge-strength values. This is also referred to as a list of link levels.

Returning to FIG. 16, the next step in the GRAPHICAL REGION MERGER process block is to invoke the process block MERGE REGIONS. This block is shown at FIG. 22. In the MERGE REGIONS process block, each link level in the sorted list is processed in a loop. The loop invokes, in series, the process blocks PRIME THE REGION FIFO, GROW EXISTING REGIONS and SEED NEW REGIONS AND CLEANUP. These process blocks are described below.

The process block PRIME THE REGION FIFO is shown in FIG. 23. This is the equivalent of the mode 1 of the pixel region growing process. It loops through each region in the current minimum edge-strength level and assigns to the region an invalid label. Next, for each of the neighboring regions, if the difference in edge-strength with the neighboring region is less than a threshold value, then there is a link between the region and the neighboring region. If the neighbor has a valid label, then the region is pushed onto a FIFO data structure. This step assigns labels to regions by placing them in a FIFO.

The process block GROW EXISTING REGIONS is shown in FIG. 24. This process propagates previously assigned labels to regions having the current distance value. The distance of a region is defined as the minimum number of links between that region and any region which received its label at a lower value of edgeness. Regions at the same distance are not allowed to give labels to each other. The first step in the process is to assign a value of one as the current distance. Next, an END OF DISTANCE mark is pushed onto the FIFO. The main body of the process block is an endless loop which takes the next item out of the FIFO, and accesses the previous label of the region in order to look up its neighbors. Next, the minimum link strength of the popped region is initialized to a large number which will be reduced by the actual link strength. At lines 17 through 30 of the process block, each neighbor of the popped region is processed to determine if its distance from a region with a new label is less than the current distance being processed and if the neighbor has a new label. If so, the block invokes the COMPUTE MERGE CRITERION process block, described above, to return the net increase in mean-square error if the regions were to be combined. If this increase is less than a threshold value, and less than the current minimum link strength, the popped region is assigned the same label as its neighboring region and the minimum link strength is set to the recently calculated link strength value.

If the neighbor's distance was equal to the current distance or if the neighbor did not have a new label, then the neighbor could not be combined with the popped region. In this instance, it may be possible to place the neighbor into the FIFO to be processed. Line 26 of FIG. 24 determines whether this may be done. If the distance of the neighbor is zero and if the neighbor has an invalid label (i.e. is an active region), then it is pushed onto the FIFO and assigned a distance equal to the current distance plus 1.

Finally, at line 32 of FIG. 24, if the new label of the popped region is not invalid then a neighboring region was found that may be merged with the popped region. The step at line 33 merges the popped region with the neighboring region that produces the smallest mean-squared error in its pixel values.

The process shown in FIG. 24 exits the endless loop when the FIFO is empty, as shown at line 6.

The process block SEED NEW REGIONS AND CLEANUP corresponds to mode 3 of the pixel SOLE algorithm. This process block examines each region in the current edgeness level and, if it has not been assigned a new label, assigns a new label and pushes the region onto the FIFO. It then processes each entry in the FIFO to determine if the entry has a neighbor region with which it could be combined. The criterion for combination is that the mean-squared error over the entire region after the combination is less than a threshold value. The merged region is then placed back in the FIFO to possibly be combined with other neighboring regions. This process block combines pairs of regions which had not been relabeled during the graph merging process.

Returning to FIG. 22, after the last link level has been processed through the SEED NEW REGIONS AND CLEANUP block, the process block MERGE REGIONS switches the region properties buffer to be the new buffer, reflecting the merge operations that happened in the loop. The process shown in FIG. 22 then returns control to the main process block shown in FIG. 16.

At line 12 of FIG. 16, the GRAPHICAL REGION MERGER overwrites the labels table with the new labels obtained in the process of merging the preexisting regions. Finally, if this is not the last iteration of the graph based merger, the process block invokes the REBUILD NEIGHBOR LISTS process block to complete the transformation of the region lists. Although the region list reflects the newly combined regions, its neighbor lists are not correct. This is caused both by neighbors being eliminated and by new neighbors being added, through the combination of neighbors of neighbors.

The algorithm used by this process block is essentially the same as the BUILD NEIGHBOR LISTS process block, described above with reference to FIG. 18. The main difference is that, instead of stepping through pixels in the raster image and determining neighbors based on data obtained from the region memory, the REBUILD NEIGHBOR LISTS process block steps through the list of regions and analyzes the existing neighbor lists to determine if entries therein should be deleted or combined. The end result is an updated offset list and an updated list of number of neighbors for each region.

As described above, the graph region growing process is applied in three passes. After the first and second passes, the REBUILD NEIGHBOR LISTS process block generates a new neighbor list which is used in the second and third passes, respectively. The inventors have determined that, for each pass, the number of regions is decreased by a factor of four. Accordingly, the additional time used for the second and third passes is a fraction of the time used for the first pass.

After the third pass of the graph region growing process, the image is converted into raster format by the block 218 shown in FIG. 2. As described above, this may be a simple table look-up process which uses the final region list and the initial region list provided by the GROW EXISTING REGIONS process block, shown in FIG. 24, to produce a region list which defines each region by a list of image pixel addresses. This region list is then converted into a raster image by assigning the average pixel value for each region to each pixel address in the region.

As shown in FIG. 1, the segmented raster image provided by the convert to raster image block 218, shown in FIG. 2, is applied to the subtracter 116 and to the lossless coder 114. As described above, the subtracter 116 subtracts the segmented raster image from the input image held in the image memory 110 to produce a residual image. This residual image is encoded for transmission by a lossy coder 118. This coder is described below with reference to FIG. 29.

LOSSLESS CODER

The goal of the lossless coder is to produce an encoded segmented image which may be stored in a single packet on the video tape. As the tape is scanned in picture-in-shuttle mode, these packets are retrieved and a low-resolution image is generated. Since the segmented image provided by the graph SOLE processor may be too large to fit into a single packet, it is processed to develop a coarse code image—which will fit into a single packet—and a sequence of complementary code images (comp. code 0 through comp. code n) which, when combined with the coarse code image reproduce the segmented image provided by the graph SOLE processor.

The segmented image is encoded using a lossless coder such as that shown in FIGS. 28a and 28b. As shown in FIG. 28a, the first step in the lossless encoding process is to encode the segmented raster image using a chain code in the encoder 2810. The chain code representation of the image is then processed through a hierarchy of encoders 2812, 2814, 2816 and 2818 to further compress the image representation. The compressed segmented image is then applied to the packetizer 120, shown in FIG. 1, where it is combined with the encoded residual image to produce a compressed image which represents an entire frame.

In the exemplary embodiments of the invention, each frame is compressed in the lossless encoder 114 and lossy encoder 118 until it is represented in a fixed maximum number of digital bits. These bits are then formed into packets which are recorded on a digital tape recorder (not shown).

The segmented image is compressed in two steps, first the raster image is encoded using a chain code or a crack code. The resulting encoded image is then further compressed using a process which hierarchically decomposes the chain code into levels, each level representing a successively more coarse representation of the image. Also at each level, a complementary code is provided which represents the differences between the chain code at the current level and the chain code for the coarse image at the next level in the process.

Further compression occurs only at level 0. The remaining levels slightly reduce the compression of the segmented image but significantly reduce the number of bits needed to represent the coarse code image.

In FIG. 28a, the segmented image provided by the segmenter 112 is processed by an 8-chain coder 2810. The operation of this coder is described in a paper by H. Freeman entitled "Computer Processing of Line Drawings" *Computer Surveys*, Vol. 6, No. 1, pp 57–97, March 1974, which is hereby incorporated by reference for its teachings on chain coding. The output data produced by this coder is a set of lists, each list describing one area of constant color in the segmented image. The entire set of lists describes the entire segmented image. Each list defines the area by defining the color and luminance value for the area and the outline of the area from a starting pixel position. Each element of the outline portion of the list is a direction in which the next border pixel is to be found. This code is termed an 8-chain code because each element in the outline list may be one of eight directions, up, up-right, right, down-right, down, down-left, left and up-left.

The 8-chain code representation includes an element for each region border pixel. Briefly, this algorithm scans the raster image until it locates a pixel which is at the border of a region. The surrounding pixels are then scanned in a predetermined order to determine in which direction the next border pixel lies. This pixel then becomes the current pixel and its surrounding pixels are scanned to locate the next border pixel. The scanning of the surrounding pixels is in a predetermined rotational direction, either clockwise or counterclockwise, such that the last pixel scanned is the previous border pixel. For abutting regions, the pixels on each side of the actual border are members of separate outline lists.

It is contemplated that the 8-chain pixel coder could be replaced by a crack encoding system such as described in the book by A. Rosenfeld et al. entitled *Digital Picture Processing*, Academic Press, New York, N.Y. which is hereby incorporated by reference for its teachings on crack coding. The crack coder encodes the image region outlines by defining the borders, or cracks, between adjoining regions. It encodes the these borders in four directions, up, right, down and left and it only defines one list element for any boundary between two pixels.

Returning to FIG. 28a, the 8-chain code representation of the image provided by the encoder 2810 is applied to a level 0 hierarchical encoder 2812. This encoder transforms the 8-chain code representation into a coarser 8-chain code representation and a complementary code, which represents the differences between the input 8-chain code and the coarse output 8-chain code.

FIG. 28b is a diagram of a hierarchical encoder and its corresponding decoder. The encoder is a look-up table (LUT) which is programmed to transform pairs of direction codes from the input 8-chain code into a coarse code and a complementary code. The complementary codes, in turn, are encoded using a variable length code. The particular variable length code that is used is different for each coarse code value. Exemplary programmed values for the LUT's 2820 are given in the attached appendices A and B. The values in Appendix A are for a level-0 hierarchical encoder and the values in Appendix B are for a hierarchical encoder at levels 1 through n.

In the exemplary embodiment of the invention, The coarse code generated by the LUT has nine possible values, up, up-right, right, down-right, down, down-left, left, up-left and no change. The no change value is used for defining coarse blocks where the underlying change in the boundary pixel position is less than one coarse pixel.

Examples of the operation of the hierarchical encoder are shown in FIGS. 28c, 28d and 28e. In these examples, the dashed lines and the solid lines define pixels at the fine level while the solid lines alone define pixels at the coarse level. As shown in the Figures, each coarse pixel includes four fine pixels. In the LUT's for the hierarchical encoders 2812, 2814 and 2816, the coarse code is defined by the nine values listed above while the complementary code is defined by the pair of fine pixel moves which define the path of the outline relative to the coarse pixel move. Each coarse pixel move defines a set of variable length codes that are used to describe the pairs of fine pixel moves that correspond to the coarse move.

By processing a number of images, a frequency distribution of each pair of fine pixel moves for each coarse move can be tabulated and converted into a corresponding probability value. The variable length codes used to represent the pairs of fine moves are generated from these probability values. It is noted that each coarse pixel move (coarse output of the hierarchical encoder) defines a separate probability distribution and so, a separate variable length code.

The fine pixel line that is to be converted into the encoded coarse and complementary codes is defined by a starting pixel position in a coarse pixel block and two successive fine pixel move operations which define two segments of the edge, each segment being one fine pixel in length.

For example, in FIG. 28c, the starting position would be the bottom right corner of coarse pixel x and the two moves would be up-right and left. For convenience, the positions in the coarse block are assigned numbers as shown in Table 1. In the same manner, the move directions are assigned numbers as shown in Table 2.

TABLE 1

| Block Position | Code |
|---|---|
| upper right | 0 |
| upper left | 1 |
| lower right | 2 |
| lower left | 3 |

TABLE 2

| Direction | Code |
|---|---|
| right | 0 |
| up | 1 |
| left | 2 |
| down | 3 |
| up-right | 4 |
| up-left | 5 |
| down-right | 6 |
| down-left | 7 |
| no change | 8 |

Referring to Appendix 1, the input values for the move illustrated in FIG. 28a would be 3 for the starting position and 4, 2 for the move. The resulting coarse and complementary codes, as contained in Appendix A, are 8 (no change) and the binary code "110011", respectively. Using the same analysis, the input values for the move illustrated in FIG. 28b would be 3 for the starting positions and 3, 6 for the move. The resulting coarse and complementary codes, again from Appendix A are 6 (down-right) and the binary code "010". Finally, the move shown in FIG. 28c would be 3 for the starting position and 3, 3 for the move. The resulting coarse and complementary codes from Appendix A are 3 (down) and the binary code "1".

As shown, FIG. 28b, the output value representing the position in the coarse block is fed back from the output to the input to serve as the starting position for the next conversion. The input values to the encoder 2820 are two successive fine move directions from the outline list. As shown in FIG. 28a, the coarse output value provided by the level 0 hierarchical encoder 2812 are the fine input values for the level 1 hierarchical encoder 2814 and so on until the level N hierarchical encoder. The coarse output values provided by this encoder are applied to a differential encoder 2818 which applies a predetermined variable length code to the coarse output values to produce an output data stream. The output data streams representing the complementary codes of the level 0 through level N hierarchical encoders 2812 through 2816. When the segmented image data has been processed, either by the 8-chain coder 2810 or any of the hierarchical encoders 2814 through 2816, to a point that a the differential coder 2818 would produce a coarse code image that would fit into a single packet, a controller 2811 causes the multiplexer 2817 to switch the output data provided by that coder to the input port of the differential coder 2818. The controller 2811 also controls the hierarchical coders 2812 through 2816 so that only the selected coders and coders which preceded it in the sequence provide valid complementary codes. The combination of the coarse code and the valid complementary codes, if any exist, fully define the segmented image.

This data is decoded using a system (not shown) which is the inverse of the encoder shown in FIG. 28a. In this system, a sequence of decoder circuits (not shown), such as the circuit 2826, shown in FIG. 28b are coupled to receive the complementary codes at one input port and a decoded coarse move direction at a second input port. The coarse code is used, in the circuitry 2822, to select a variable length code (VLC) which is applied to a VLC decoder 2824. The decoder 2824 uses this code to obtain two direction vectors. These vectors are applied as coarse codes, each with a respective complementary code, to the next level of the decoder. The initial level of the decoder (not shown) receives the encoded coarse code provided by the differential coder 2818 and produces the coarse code input value for the decoder circuit which processes the complementary code generated by the level N hierarchical encoder 2816.

The lossy coder used to encode the residual image may be any of a number of well-known coders based on linear transforms. One example is the encoder used in the standard set forth by the Joint Photographic Experts Group (JPEG). Another example is shown in FIG. 29. Both the encoder and decoder are shown in FIG. 29. In this coder, the residual image is processed by a forward linear transform processor 2910. This may be, for example, a filter bank with subband or wavelet filters, or a block discrete cosine transform algorithm. An exemplary subband filter bank is described in U.S. Pat. No. 5,202,760 entitled INFORMATION COMPRESSION METHOD AND DEVICE FOR COMPATIBLE DECODING OF A GROUP OF TELEVISION SIGNALS WITH INCREASING RESOLUTIONS, which is hereby incorporated by reference for its teachings on video signal encoding.

The output data provided by the forward linear transform processor 2910 is a set of coefficient values representing respectively different frequency bands of the residual image. The coefficient values are ordered such that all coefficients representing the same "frequency band" in successive residual images are grouped together such that each frequency band may be encoded separately. Next, an adaptive bit-allocation processor 2912 determines a total number of bits available to encode the data and distributes these bits among the respective frequency bands according to their relative importance. Since the human eye is less sensitive to quantization errors in the higher frequency bands than it is to similar errors in the lower frequency bands, the assignment of bits decreases with increasing frequency bands.

Following the bit assignments, the coefficient values representing the respective frequency bands are quantized and the results applied to respective variable length encoders 2914a through 2914n. These encoders further compress the data stream by transforming each value into a respective VLC code value. The particular variable length codes that are used may be determined, for example, by generating a frequency distribution of quantized coefficient values developed from a sequence of natural images.

The VLC encoded coefficient values produced by the encoders 2914a through 2914n are multiplexed into a single data stream by the packing circuitry 2916. As shown in FIG. 1, this data stream is combined, in the packetizer 120, with the data stream provided by the lossless coder 114 to produce the data stream that is recorded by the digital tape recorder.

When the data stream representing the residual data stream is recovered on play-back, The multiplexed data stream is demultiplexed by the circuitry 2920, decoded by the VLC decoders 2922a through 2922n and processed by the inverse linear transform processor 2924 to recover the residual image. This is then combined with the segmented image provided by the segmented decoder (not shown) to reproduce the original image.

While the invention has been described in terms of exemplary embodiments, it is contemplated that it may be practiced as outlined above within the spirit and scope of the appended claims.

What is claimed:

1. Apparatus for compressing digital data representing an input image, the data representing the input image as a matrix of picture elements (pixels), the apparatus comprising:

processing means for processing the data representing the input image to generate data representing a segmented image having boundaries which correspond to boundaries in the input image;

means for combining the data representing the segmented image with the data representing the input image to produce data representing a residual image, the residual image representing the input image minus the segmented image using a first quantity of data;

first encoding means for losslessly encoding the data representing the segmented image to produce encoded segmented image data in a manner that allows the encoded segmented image data to be decoded without losing detail in the decoded segmented image;

second encoding means for encoding the data representing the residual image to produce encoded residual image data which represents the residual image using a second quantity of data where the first quantity of data is greater than the second quantity of data; and means for combining the encoded segmented image data and the encoded residual image data to produce the compressed digital data.

2. Apparatus according to claim 1, wherein:

the processing means comprises means for graph-based processing the input image to produce the segmented image; and the first encoding means comprises means for chain encoding the segmented image to produce the encoded segmented image.

3. Apparatus according to claim 1 wherein the first encoding means comprises:

means for processing the data representing the segmented image to produce a description of the segmented image as a sequence of encoded segment borders, each border being represented by a sequence of displacements that define a path around the border, to produce data representing a partially encoded segmented image;

means for encoding the data representing the partially encoded segmented image to produce a hierarchically encoded segmented image, in which each pair of values in each sequence of encoded borders of the processed segmented image is represented by a single sequence value and a complementary code value in the hierarchically encoded segmented image; and means for processing the complementary code values and the single sequence values using a predetermined set of variable length codes to produce variable-length encoded image data as the encoded segmented image data.

4. Apparatus according to claim 3, wherein the processing means comprises:

pixel-based processing means for processing the data representing the input image to produce pixel-based image data representing the input image as a plurality of groups of pixels separated by a plurality of edges;

means for converting the data produced by the pixel-based processing means into graph data having nodes and links connecting the nodes to form connected regions, where each of the nodes represents a region in the pixel-based image data and each link represents a border between two corresponding groups of pixels in the pixel-based image data;

graph-based processing means for combining selected ones of the connected regions using the graph data to produce data representing the input image as a reduced number of connected regions; and means for converting the data produced by the graph-based processing means into a matrix of pixel values to produce the data representing the segmented image.

5. Apparatus according to claim 4, wherein the pixel based processing means includes:

edge finder means for processing the data representing the input image to produce data representing edges in the input image; and pixel combining means for processing the data produced by the edge finder means to generate data representing the input image as the plurality of groups of pixels separated by the plurality of edges.

6. Apparatus according to claim 5, wherein the pixel combining means includes means for combining selected groups of pixel values as defined by the data produced by the edge finder means to reduce the number of groups of pixels used to represent the input image.

7. Apparatus according to claim 5, wherein the edge finder means includes:

means for determining a first set of difference values representing respective differences in magnitude between each pixel in the image and each adjacent pixel in the matrix of pixel values;

means for determining a second set of difference values representing respective differences in magnitude between each pixel in the image and N–1 pixels in a respective group of N pixels, where each group of N pixels defines a vector on the matrix of pixels; and means for comparing each difference value in the first set of difference values with a respective difference value in the second set of difference values to determine the greater thereof and for providing the determined values as a third set of difference values, which third set of difference values defines the edges in the input image.

8. Apparatus for compressing digital data representing an input image, the data representing the input image as a matrix of picture elements (pixels), the apparatus comprising:

processing means for processing the data representing the input image to generate data representing the image as a segmented image having groups of pixel values separated by edges where the edges correspond to boundaries in the input image;

means for subtracting the data representing the segmented image from the data representing the input image to produce data representing a residual image;

lossless encoding means for encoding the data representing the segmented image to produce encoded segmented image data in a manner that allows the encoded segmented image data to be decoded without losing any detail in the decoded segmented image;

lossy encoding means for encoding the data representing the residual image to produce encoded residual image data which represents an approximation of the residual image; and means for combining the encoded segmented image data and the encoded residual image data to produce the compressed digital data.

9. Apparatus according to claim 8, wherein the lossless encoding means includes means for encoding the data representing the segmented image as a first component having a predetermined maximum size and as a second component representing a difference between the data representing the segmented image and the decoded first component.

10. A method of compressing digital data representing an input image, the data representing the input image as a matrix of picture elements (pixels), the method comprising the steps of:

a) locating boundaries in the input image to generate data representing a segmented image having boundaries which correspond to boundaries in the input image;

b) subtracting the data representing the segmented image from the data representing the input image to produce data representing a residual image;

c) losslessly encoding the data representing the segmented image to produce encoded segmented image data which may be decoded without losing detail in the decoded segmented image;

d) encoding the data representing the residual image to produce encoded residual image data which represents an approximation of the residual image; and e) combining the encoded segmented image data and the encoded residual image data to produce the compressed digital data.

11. A method according to claim 10, further comprising the step of processing the data representing the segmented image, provided by step a), to combine image segments and to generate output data representing the input image as a smaller number of segments, said output data being processed by step b).

12. The method according to claim 10, wherein:

step a) further comprises the step of graph-based processing the input image to produce the segmented image; and step c) further comprises the step of chain encoding the segmented image to produce the encoded segmented image.

\* \* \* \* \*